(12) United States Patent
English et al.

(10) Patent No.: US 11,940,816 B2
(45) Date of Patent: Mar. 26, 2024

(54) AIRCRAFT CONTROL SYSTEM AND METHOD

(71) Applicant: Joby Aero, Inc., Santa Cruz, CA (US)

(72) Inventors: Blake English, Santa Cruz, CA (US); JoeBen Bevirt, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 44 days.

(21) Appl. No.: 17/206,788

(22) Filed: Mar. 19, 2021

(65) Prior Publication Data

US 2021/0294355 A1 Sep. 23, 2021

Related U.S. Application Data

(62) Division of application No. 16/708,367, filed on Dec. 9, 2019, now Pat. No. 10,983,534.

(Continued)

(51) Int. Cl.
| | |
|---|---|
| *B64C 13/04* | (2006.01) |
| *B64C 27/54* | (2006.01) |
| *B64C 29/00* | (2006.01) |
| *G05D 1/00* | (2006.01) |
| *G05D 1/08* | (2006.01) |

(52) U.S. Cl.
CPC ............. *G05D 1/102* (2013.01); *B64C 13/04* (2013.01); *B64C 13/0421* (2018.01); *B64C 27/54* (2013.01); *B64C 29/0033* (2013.01); *G05D 1/0858* (2013.01)

(58) Field of Classification Search
CPC .. B64C 13/0421; B64C 27/56; G05D 1/0016; G05D 1/0858; G05G 2009/04774; H01H 9/0066
See application file for complete search history.

(56) References Cited

U.S. PATENT DOCUMENTS 1,386,713 A 8/1921 Leinweber et al.
1,496,723 A 6/1924 Miller
(Continued)

FOREIGN PATENT DOCUMENTS

CN 102239321 A 11/2011
CN 102245878 A 11/2011
(Continued)

OTHER PUBLICATIONS

Perfect, Phillip et al. "Unified tiltrotor handling qualities; feasible or impracticable? Part II: Control Concepts." 33rd European Rotorcraft Forum, Kazan, Russia, 2007, 23 pages (Year: 2007).*

(Continued)

*Primary Examiner* — David A Testardi
(74) *Attorney, Agent, or Firm* — SCHWEGMAN LUNDBERG & WOESSNER, P.A.

(57) ABSTRACT

The unified command system and/or method includes an input mechanism, a flight processor that receives input from the input mechanism and translates the input into control output, and effectors that are actuated according to the control output. The system can optionally include: one or more sensors, a vehicle navigation system which determines a vehicle state and/or flight regime based on data from the one or more sensors, and a vehicle guidance system which determines a flightpath for the aircraft.

12 Claims, 12 Drawing Sheets

310

| Flight Regime | Single Inceptor axis mapping and response types - Lon. Unified | Single Inceptor axis mapping and response types - Lon. + Lat. Unified |
|---|---|---|
| Hover: | X - vertical rate<br>Y - lateral translational rate / acceleration<br>Z - heading rate (yaw)<br>A - longitudinal translational rate & acceleration<br>(B - deck angle) | X - vertical rate<br>Y - heading rate (yaw)<br>Z - lateral translational rate / acceleration<br>A - longitudinal translational rate & acceleration |
| Forward flight: | X - pitch rate/flightpath<br>Y - roll rate/flightpath<br>Z - sideslip<br>A - airspeed rate<br><br>FMS could configures aircraft to allow delta-flightpath (or equivalent) control for conventional landings. | X - pitch rate/flightpath<br>Y - roll rate/flightpath/heading rate<br>Z - sideslip<br>A - airspeed rate<br><br>FMS likely configures aircraft to allow delta-flightpath (or equivalent) control for conventional landings. |
| Ground operations: | Brake model uses forward stick X motion to command braking effort. (Button - Brake hold)<br><br>Z - steering*<br><br>A - Prop thrust, wheel motors | Brake model uses forward X motion to command braking effort. Button - Brake hold<br><br>Y - steering<br><br>A - wheel motors/prop taxi thrust |

Related U.S. Application Data

(60) Provisional application No. 62/776,870, filed on Dec. 7, 2018.

(56) References Cited

U.S. PATENT DOCUMENTS

| | | |
|---|---|---|
| 1,794,202 A | 2/1931 | Pickard |
| D171,509 S | 2/1954 | Lightbourn et al. |
| 2,868,476 A | 1/1959 | Schlieben |
| 2,969,935 A | 1/1961 | Price |
| 2,981,339 A | 4/1961 | Kaplan |
| 3,002,712 A | 10/1961 | Sterling |
| 3,035,789 A | 5/1962 | Young |
| 3,059,876 A | 10/1962 | Platt |
| 3,081,964 A | 3/1963 | Quenzler |
| 3,082,977 A | 3/1963 | Melvin |
| 3,089,666 A | 5/1963 | Quenzler |
| 3,136,499 A | 6/1964 | Kessler |
| 3,141,633 A | 7/1964 | Mackay |
| 3,159,361 A | 12/1964 | Weiland |
| 3,181,810 A | 5/1965 | Olson |
| 3,231,221 A | 1/1966 | Platt |
| 3,259,343 A | 7/1966 | Roppel |
| 3,350,035 A | 10/1967 | Schlieben |
| 3,360,217 A | 12/1967 | Trotter |
| 3,404,852 A | 10/1968 | Sambell et al. |
| 3,592,412 A | 7/1971 | Glatfelter |
| 3,618,875 A | 11/1971 | Kappus |
| 3,693,910 A | 9/1972 | Aldi |
| 3,795,372 A | 3/1974 | Feldman |
| 3,834,654 A | 9/1974 | Miranda |
| 3,856,238 A | 12/1974 | Malvestuto |
| 4,022,405 A | 5/1977 | Peterson |
| 4,047,840 A | 9/1977 | Ravenhall et al. |
| 4,053,125 A | 10/1977 | Ratony |
| 4,071,207 A * | 1/1978 | Piasecki ............. B64C 29/0025 244/221 |
| 4,146,199 A | 3/1979 | Wenzel |
| 4,263,786 A | 4/1981 | Eng |
| 4,356,546 A | 10/1982 | Whiteside et al. |
| 4,387,866 A | 6/1983 | Eickmann |
| 4,459,083 A | 7/1984 | Bingham |
| 4,519,746 A | 5/1985 | Wainauski et al. |
| 4,569,633 A | 2/1986 | Flemming |
| 4,667,909 A | 5/1987 | Curci |
| 4,742,760 A | 5/1988 | Horstman et al. |
| 4,784,351 A | 11/1988 | Eickmann |
| 4,799,629 A | 1/1989 | Mori |
| 4,914,657 A | 4/1990 | Walter et al. |
| 4,925,131 A | 5/1990 | Eickmann |
| 4,979,698 A | 12/1990 | Lederman |
| 4,982,914 A | 1/1991 | Eickmann |
| 5,001,646 A * | 3/1991 | Caldwell ............. G05D 1/0858 701/3 |
| 5,031,858 A | 7/1991 | Schellhase et al. |
| 5,082,079 A | 1/1992 | Lissaman et al. |
| 5,085,315 A | 2/1992 | Sambell |
| 5,141,176 A | 8/1992 | Kress et al. |
| 5,156,363 A | 10/1992 | Cizewski et al. |
| 5,174,721 A | 12/1992 | Brocklehurst |
| 5,184,304 A | 2/1993 | Huddle |
| 5,374,010 A | 12/1994 | Stone et al. |
| 5,381,985 A | 1/1995 | Wechsler et al. |
| 5,405,105 A | 4/1995 | Kress |
| 5,419,514 A | 5/1995 | Duncan |
| 5,472,156 A * | 12/1995 | Bivens, III ............. B64C 27/56 244/234 |
| 5,515,282 A | 5/1996 | Jackson |
| 5,715,162 A | 2/1998 | Daigle |
| 5,806,805 A | 9/1998 | Elbert et al. |
| 5,823,468 A | 10/1998 | Bothe |
| 5,839,691 A | 11/1998 | Lariviere |
| 5,842,667 A | 12/1998 | Jones |
| 5,868,351 A | 2/1999 | Stamps et al. |
| 5,899,085 A | 5/1999 | Williams |
| 6,098,923 A | 8/2000 | Peters |
| 6,254,032 B1 | 7/2001 | Bucher |
| 6,260,796 B1 | 7/2001 | Klingensmith |
| 6,276,633 B1 | 8/2001 | Balayn et al. |
| 6,286,783 B1 | 9/2001 | Kuenkler |
| 6,293,491 B1 | 9/2001 | Wobben |
| 6,343,127 B1 | 1/2002 | Billoud |
| 6,402,088 B1 | 6/2002 | Syrovy et al. |
| 6,460,810 B2 | 10/2002 | James |
| 6,474,604 B1 | 11/2002 | Carlow |
| 6,561,455 B2 | 5/2003 | Capanna |
| 6,625,033 B1 | 9/2003 | Steinman |
| 6,655,631 B2 | 12/2003 | Austen-Brown |
| 6,719,244 B1 | 4/2004 | Gress |
| 6,745,977 B1 | 6/2004 | Long et al. |
| 6,883,748 B2 | 4/2005 | Yoeli |
| 6,892,980 B2 | 5/2005 | Kawai |
| 7,048,505 B2 | 5/2006 | Segota et al. |
| 7,118,066 B2 | 10/2006 | Allen |
| 7,147,182 B1 | 12/2006 | Flanigan |
| 7,159,817 B2 | 1/2007 | Vandermey et al. |
| 7,219,013 B1 | 5/2007 | Young et al. |
| 7,263,630 B2 | 8/2007 | Sailer |
| 7,310,573 B2 | 12/2007 | Stickling |
| 7,318,565 B2 | 1/2008 | Page |
| 7,364,114 B2 | 4/2008 | Wobben |
| 7,376,088 B2 | 5/2008 | Gambardella et al. |
| 7,802,754 B2 | 9/2010 | Karem |
| 7,822,516 B2 | 10/2010 | Yanaka et al. |
| 7,857,253 B2 | 12/2010 | Yoeli |
| 7,857,254 B2 | 12/2010 | Parks |
| 7,874,513 B1 | 1/2011 | Smith |
| 7,877,627 B1 | 1/2011 | Freydel |
| 7,950,606 B2 | 5/2011 | Atkey et al. |
| 8,016,226 B1 | 9/2011 | Wood |
| 8,016,566 B2 | 9/2011 | Agnihotri et al. |
| 8,056,866 B2 | 11/2011 | De |
| 8,152,096 B2 | 4/2012 | Smith |
| 8,275,494 B1 | 9/2012 | Roth |
| 8,376,264 B1 | 2/2013 | Hong et al. |
| 8,469,306 B2 | 6/2013 | Kuhn |
| 8,485,464 B2 | 7/2013 | Kroo |
| 8,527,233 B2 | 9/2013 | Mcintyre |
| 8,602,347 B2 | 12/2013 | Isaac et al. |
| 8,616,492 B2 | 12/2013 | Oliver |
| 8,708,273 B2 | 4/2014 | Oliver |
| 8,733,690 B2 | 5/2014 | Bevirt et al. |
| 8,800,912 B2 | 8/2014 | Oliver |
| 8,849,479 B2 | 9/2014 | Walter |
| 8,998,125 B2 | 4/2015 | Hollimon et al. |
| 9,046,109 B2 | 6/2015 | Duke et al. |
| 9,075,144 B1 | 7/2015 | Straub et al. |
| 9,102,401 B2 | 8/2015 | Collins et al. |
| 9,128,109 B1 | 9/2015 | Oneill |
| 9,316,141 B2 | 4/2016 | Pilavdzic |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,527,581 B2 | 12/2016 | Bevirt et al. |
| 9,561,857 B2 | 2/2017 | Weber |
| 9,694,911 B2 | 7/2017 | Bevirt et al. |
| 9,771,157 B2 | 9/2017 | Gagne et al. |
| 9,786,961 B2 | 10/2017 | Dyer et al. |
| 9,851,723 B2 | 12/2017 | Builta |
| 9,855,819 B2 | 1/2018 | Ochocinski et al. |
| 9,898,033 B1 * | 2/2018 | Long ..................... G01D 5/145 |
| 9,944,386 B1 | 4/2018 | Reichert et al. |
| 9,963,228 B2 | 5/2018 | McCullough et al. |
| 10,029,808 B2 | 7/2018 | Blanding et al. |
| 10,046,855 B2 | 8/2018 | Bevirt et al. |
| 10,101,719 B1 * | 10/2018 | Kroo ..................... B64C 13/503 |
| 10,144,503 B1 | 12/2018 | Vander Lind et al. |
| 10,144,504 B1 | 12/2018 | Selwa et al. |
| 10,183,746 B2 | 1/2019 | Mccullough et al. |
| 10,208,676 B2 | 2/2019 | Johnson et al. |
| 10,246,184 B2 | 4/2019 | Ragland |
| 10,247,100 B2 | 4/2019 | Leamy et al. |
| 10,287,011 B2 | 5/2019 | Wolff et al. |
| 10,364,036 B2 | 7/2019 | Tighe et al. |

(56) References Cited

U.S. PATENT DOCUMENTS

| | | | |
|---|---|---|---|
| 10,392,107 B2 | 8/2019 | Har et al. | |
| 10,407,164 B2 | 9/2019 | Blumer | |
| 10,497,996 B1 | 12/2019 | Muniz et al. | |
| 10,501,194 B2 | 12/2019 | Knapp et al. | |
| 10,513,334 B2 | 12/2019 | Groninga et al. | |
| 10,780,786 B2 | 9/2020 | Del Core | |
| 10,983,534 B2* | 4/2021 | English | B64C 27/56 244/6 |
| 2002/0153452 A1* | 10/2002 | King | B64C 27/56 244/6 |
| 2003/0038213 A1 | 2/2003 | Yoeli | |
| 2003/0062443 A1 | 4/2003 | Wagner et al. | |
| 2003/0080242 A1 | 5/2003 | Kawai | |
| 2003/0085319 A1 | 5/2003 | Wagner et al. | |
| 2003/0094537 A1 | 5/2003 | Austen-Brown | |
| 2003/0106959 A1 | 6/2003 | Fukuyama | |
| 2004/0093130 A1* | 5/2004 | Osder | B64C 27/18 244/175 |
| 2004/0126241 A1 | 7/2004 | Zha et al. | |
| 2004/0141170 A1 | 7/2004 | Jamieson et al. | |
| 2004/0195460 A1 | 10/2004 | Sailer | |
| 2004/0245376 A1 | 12/2004 | Muren | |
| 2004/0261428 A1 | 12/2004 | Murry et al. | |
| 2005/0178879 A1 | 8/2005 | Mao | |
| 2005/0230524 A1 | 10/2005 | Ishiba | |
| 2005/0251328 A1 | 11/2005 | Merwe et al. | |
| 2006/0016930 A1 | 1/2006 | Pak | |
| 2006/0097103 A1 | 5/2006 | Atmur | |
| 2006/0113426 A1 | 6/2006 | Yoeli | |
| 2006/0226281 A1 | 10/2006 | Walton | |
| 2007/0036657 A1 | 2/2007 | Wobben | |
| 2007/0154314 A1 | 7/2007 | Jarrah et al. | |
| 2007/0170307 A1* | 7/2007 | de la Cierva Hoces | B64C 27/24 244/7 R |
| 2007/0221779 A1 | 9/2007 | Ikeda | |
| 2007/0235593 A1* | 10/2007 | Rollet | B64D 43/00 244/221 |
| 2008/0048065 A1 | 2/2008 | Kuntz | |
| 2008/0205416 A1 | 8/2008 | Dechiara | |
| 2008/0237392 A1* | 10/2008 | Piasecki | B64C 27/82 244/6 |
| 2008/0283673 A1 | 11/2008 | Yoeli | |
| 2009/0008499 A1 | 1/2009 | Shaw | |
| 2009/0084907 A1 | 4/2009 | Yoeli | |
| 2009/0140102 A1 | 6/2009 | Yoeli | |
| 2009/0159757 A1 | 6/2009 | Yoeli | |
| 2009/0200431 A1 | 8/2009 | Konings et al. | |
| 2009/0224095 A1 | 9/2009 | Cox et al. | |
| 2009/0283629 A1 | 11/2009 | Kroetsch et al. | |
| 2010/0025006 A1 | 2/2010 | Zhou | |
| 2010/0052978 A1 | 3/2010 | Tillotson | |
| 2010/0072325 A1 | 3/2010 | Sambell | |
| 2010/0076625 A1* | 3/2010 | Yoeli | B64C 13/044 244/175 |
| 2010/0100260 A1 | 4/2010 | McIntyre et al. | |
| 2010/0193644 A1 | 8/2010 | Karem | |
| 2010/0264257 A1 | 10/2010 | Brunken | |
| 2010/0270419 A1 | 10/2010 | Yoeli | |
| 2010/0270435 A1 | 10/2010 | Karem | |
| 2011/0001020 A1 | 1/2011 | Forgac | |
| 2011/0024552 A1 | 2/2011 | Patt et al. | |
| 2011/0042508 A1 | 2/2011 | Bevirt | |
| 2011/0042509 A1 | 2/2011 | Bevirt et al. | |
| 2011/0042510 A1 | 2/2011 | Bevirt et al. | |
| 2011/0049306 A1 | 3/2011 | Yoeli | |
| 2011/0049307 A1 | 3/2011 | Yoeli | |
| 2011/0139923 A1 | 6/2011 | Papanikolopoulos et al. | |
| 2011/0139939 A1 | 6/2011 | Martin et al. | |
| 2011/0147533 A1 | 6/2011 | Goossen et al. | |
| 2011/0180656 A1 | 7/2011 | Shue et al. | |
| 2011/0284201 A1 | 11/2011 | Soenmez et al. | |
| 2011/0303795 A1 | 12/2011 | Oliver | |
| 2011/0315809 A1 | 12/2011 | Oliver | |
| 2012/0025016 A1 | 2/2012 | Methven et al. | |
| 2012/0061526 A1 | 3/2012 | Brunken | |
| 2012/0091257 A1 | 4/2012 | Wolff et al. | |
| 2012/0222441 A1 | 9/2012 | Sawada et al. | |
| 2012/0234518 A1 | 9/2012 | Brodie et al. | |
| 2012/0234968 A1 | 9/2012 | Smith | |
| 2012/0251326 A1 | 10/2012 | Schimke et al. | |
| 2012/0253558 A1* | 10/2012 | Christensen | G05D 1/0858 701/3 |
| 2013/0060406 A1* | 3/2013 | Christensen | G05D 1/0858 701/4 |
| 2013/0090788 A1* | 4/2013 | Christensen | G05D 1/0858 701/4 |
| 2013/0132548 A1 | 5/2013 | Cabos | |
| 2013/0138270 A1* | 5/2013 | Christensen | B64C 19/00 701/3 |
| 2013/0138413 A1 | 5/2013 | Finch et al. | |
| 2013/0164578 A1 | 6/2013 | Sweet et al. | |
| 2013/0201316 A1 | 8/2013 | Binder et al. | |
| 2013/0204544 A1 | 8/2013 | Thomas | |
| 2014/0027565 A1* | 1/2014 | Marvin | G05D 1/102 244/17.13 |
| 2014/0039735 A1 | 2/2014 | Major et al. | |
| 2014/0046510 A1 | 2/2014 | Randolph et al. | |
| 2014/0096501 A1 | 4/2014 | Pantalone et al. | |
| 2014/0138492 A1 | 5/2014 | Van Staagen | |
| 2014/0174707 A1 | 6/2014 | Lombardo et al. | |
| 2014/0193683 A1 | 7/2014 | Mardall et al. | |
| 2014/0230761 A1 | 8/2014 | Pilavdzic | |
| 2014/0277869 A1 | 9/2014 | King et al. | |
| 2014/0292260 A1 | 10/2014 | Dyer et al. | |
| 2014/0299708 A1 | 10/2014 | Green et al. | |
| 2014/0339372 A1 | 11/2014 | Dekel et al. | |
| 2014/0358333 A1 | 12/2014 | White et al. | |
| 2014/0379178 A1* | 12/2014 | Goossen | G05D 1/0038 701/15 |
| 2015/0012154 A1 | 1/2015 | Senkel et al. | |
| 2015/0056058 A1 | 2/2015 | Grissom et al. | |
| 2015/0102659 A1 | 4/2015 | Liffring et al. | |
| 2015/0136897 A1 | 5/2015 | Seibel et al. | |
| 2015/0147181 A1 | 5/2015 | Henze et al. | |
| 2015/0232178 A1 | 8/2015 | Reiter | |
| 2015/0266571 A1 | 9/2015 | Bevirt et al. | |
| 2015/0274292 A1* | 10/2015 | DeLorean | B64C 27/32 244/6 |
| 2015/0360794 A1 | 12/2015 | Certain et al. | |
| 2015/0367937 A1* | 12/2015 | Greenfield | G05D 1/0858 701/4 |
| 2016/0026190 A1 | 1/2016 | Kowalski et al. | |
| 2016/0031555 A1 | 2/2016 | Bevirt et al. | |
| 2016/0031556 A1 | 2/2016 | Bevirt et al. | |
| 2016/0083073 A1 | 3/2016 | Beckman | |
| 2016/0107501 A1 | 4/2016 | Johnston | |
| 2016/0109882 A1 | 4/2016 | Ouellette et al. | |
| 2016/0112151 A1 | 4/2016 | Chedas et al. | |
| 2016/0144957 A1 | 5/2016 | Claridge et al. | |
| 2016/0167800 A1 | 6/2016 | Joubert et al. | |
| 2016/0204488 A1 | 7/2016 | Arai et al. | |
| 2016/0209290 A1 | 7/2016 | Shue | |
| 2016/0214723 A1 | 7/2016 | Fox et al. | |
| 2016/0236790 A1 | 8/2016 | Knapp et al. | |
| 2016/0265556 A1 | 9/2016 | Stadler et al. | |
| 2016/0272312 A1 | 9/2016 | Mallard | |
| 2016/0294882 A1 | 10/2016 | Michaels | |
| 2016/0304194 A1 | 10/2016 | Bevirt et al. | |
| 2016/0304214 A1 | 10/2016 | Himmelmann et al. | |
| 2016/0325841 A1 | 11/2016 | Beckman et al. | |
| 2016/0342159 A1 | 11/2016 | Lanterna et al. | |
| 2017/0036753 A1* | 2/2017 | Shue | B64C 13/04 |
| 2017/0066531 A1 | 3/2017 | Mcadoo | |
| 2017/0101176 A1 | 4/2017 | Alber et al. | |
| 2017/0104385 A1 | 4/2017 | Salamon et al. | |
| 2017/0131716 A1 | 5/2017 | Brekke et al. | |
| 2017/0137132 A1 | 5/2017 | Wiegers et al. | |
| 2017/0217584 A1* | 8/2017 | Elfeky | G05D 1/0858 701/3 |
| 2017/0247126 A1 | 8/2017 | Blanding et al. | |
| 2017/0267371 A1 | 9/2017 | Frolov et al. | |

(56) References Cited

U.S. PATENT DOCUMENTS

| | | |
|---|---|---|
| 2017/0274983 A1 | 9/2017 | Beckman et al. |
| 2017/0277152 A1 | 9/2017 | Liu et al. |
| 2017/0297431 A1 | 10/2017 | Epstein et al. |
| 2017/0329349 A1* | 11/2017 | Greenfield .......... G05D 1/0825 |
| 2017/0331323 A1 | 11/2017 | Ehrmantraut |
| 2018/0001994 A1 | 1/2018 | Morrison |
| 2018/0002016 A1 | 1/2018 | McCullough et al. |
| 2018/0105279 A1 | 4/2018 | Tighe et al. |
| 2018/0115029 A1 | 4/2018 | Ren et al. |
| 2018/0134400 A1 | 5/2018 | Knapp et al. |
| 2018/0148182 A1 | 5/2018 | Fagundes et al. |
| 2018/0183657 A1 | 6/2018 | Beilin et al. |
| 2018/0215475 A1 | 8/2018 | Hurt et al. |
| 2018/0237148 A1 | 8/2018 | Hehn et al. |
| 2018/0239366 A1 | 8/2018 | Cutler et al. |
| 2018/0244370 A1 | 8/2018 | Lombard |
| 2018/0251207 A1 | 9/2018 | Kim |
| 2018/0251226 A1 | 9/2018 | Fenny et al. |
| 2018/0287234 A1 | 10/2018 | Melack et al. |
| 2018/0290736 A1 | 10/2018 | Mikic et al. |
| 2018/0305030 A1 | 10/2018 | Galzin |
| 2018/0319491 A1 | 11/2018 | Kearney-Fischer |
| 2018/0354615 A1 | 12/2018 | Groninga et al. |
| 2018/0356439 A1 | 12/2018 | Luo et al. |
| 2018/0358664 A1 | 12/2018 | Zhang et al. |
| 2018/0362166 A1 | 12/2018 | Marr et al. |
| 2019/0004542 A1 | 1/2019 | Kim |
| 2019/0064850 A1* | 2/2019 | Vincent ................ B64C 13/503 |
| 2019/0077219 A1 | 3/2019 | Frieling et al. |
| 2019/0097282 A1 | 3/2019 | Melack et al. |
| 2019/0144109 A1 | 5/2019 | Ewing et al. |
| 2019/0155282 A1* | 5/2019 | Kim ...................... B64C 13/503 |
| 2019/0202310 A1 | 7/2019 | Gebhart |
| 2019/0210740 A1 | 7/2019 | Luo |
| 2019/0214161 A1 | 7/2019 | Chen et al. |
| 2019/0315471 A1 | 10/2019 | Moore et al. |
| 2019/0316849 A1 | 10/2019 | Mendez Abrego et al. |
| 2019/0332125 A1* | 10/2019 | Irwin, III .............. B64C 13/506 |
| 2019/0332126 A1* | 10/2019 | Irwin, III ................ B64C 27/52 |
| 2019/0341659 A1 | 11/2019 | Terwilliger |
| 2019/0351740 A1 | 11/2019 | Filipkowski et al. |
| 2020/0001995 A1 | 1/2020 | Yang et al. |
| 2020/0140094 A1 | 5/2020 | White |
| 2020/0142431 A1 | 5/2020 | Mehl et al. |
| 2020/0148347 A1 | 5/2020 | Bevirt et al. |
| 2020/0198767 A1* | 6/2020 | Dee ........................ B64C 13/10 |
| 2020/0207477 A1 | 7/2020 | Ghesquiere et al. |
| 2020/0303789 A1 | 9/2020 | Macdonald et al. |
| 2020/0333805 A1 | 10/2020 | English et al. |
| 2020/0339010 A1 | 10/2020 | Mllanueva et al. |
| 2020/0350648 A1 | 11/2020 | Rheaume |
| 2020/0355121 A1 | 11/2020 | O'Meallie et al. |
| 2020/0376927 A1 | 12/2020 | Rajaie et al. |
| 2020/0385127 A1 | 12/2020 | Devault |
| 2020/0391876 A1 | 12/2020 | Morrison |

FOREIGN PATENT DOCUMENTS

| | | |
|---|---|---|
| CN | 102407944 A | 4/2012 |
| CN | 102245878 B | 11/2013 |
| CN | 102239321 B | 7/2014 |
| CN | 103363993 | 4/2016 |
| CN | 103363993 A | 4/2016 |
| CN | 107042884 A | 8/2017 |
| CN | 107709161 A | 2/2018 |
| CN | 108349585 A | 7/2018 |
| DE | 102012104783 A1 | 12/2013 |
| EP | 0945841 A1 | 9/1999 |
| EP | 2423106 A2 | 2/2012 |
| EP | 3210885 A1 | 8/2017 |
| EP | 3315401 A1 | 5/2018 |
| EP | 3366583 A1 | 8/2018 |
| EP | 3401216 A1 | 11/2018 |
| EP | 3499634 A1 | 6/2019 |
| EP | 3565083 A1 | 11/2019 |
| GB | 1271102 A | 4/1972 |
| JP | 2017154728 A | 9/2017 |
| JP | 2022513188 | 2/2022 |
| WO | 03074924 A1 | 9/2003 |
| WO | 03086857 A1 | 10/2003 |
| WO | 2016034830 A1 | 3/2016 |
| WO | 2016189421 A1 | 12/2016 |
| WO | 2017009037 A1 | 1/2017 |
| WO | 2017108634 A1 | 6/2017 |
| WO | 2019001203 A1 | 1/2019 |
| WO | 2019056053 A1 | 3/2019 |
| WO | 2020180373 | 9/2020 |
| WO | 2020180373 | 10/2020 |

OTHER PUBLICATIONS

Walker, Gregory et al., "F-35B integrated flight-propulsion control development", AIAA Aviation Forum, 2013 International Powered Lift Conference, Aug. 12-14, 2013, Los Angeles, CA, AIA Paper 10.2514/6.2013-4243, 16 pages (Year: 2013).*

Vigano, Luca et al., "Development of Augmented Control Laws for a Tiltrotor in Low and High Speed Flight Modes," 43rd European Rotorcraft Forum Proceedings, Sep. 12-15, 2017, Milan, Italy, vol. 1, pp. 438 to 451 (Year: 2017).*

Wikipedia article, "D-pad", Old revision dated Nov. 16, 2019, 3 pages (Year: 2019).*

Wikipedia article, "Joystick", Old revision dated Nov. 21, 2019, 9 pages (Year: 2019).*

Head, Elan, "Q-and-A with Joby Aviation's Justin Paines", Vertical Magazine, Jun. 6, 2019, 6 pages, downloaded from: https://verticalmag.com/q-and-a/joby-aviation-justin-paines/ (Year: 2019).*

"International Application Serial No. PCT US2019 065301, Written Opinion dated Aug. 31, 2020", 6 pgs.

"U.S. Appl. No. 16/708,367, Restriction Requirement dated Mar. 16, 2020", 8 pgs.

"U.S. Appl. No. 16/708,367, Response filed May 4, 2020 to Restriction Requirement dated Mar. 16, 2020", 9 pgs.

"U.S. Appl. No. 16/708,367, Non Final Office Action dated Jul. 14, 2020", 39 pgs.

"U.S. Appl. No. 16/708,367, Response filed Oct. 28, 2020 to Non Final Office Action dated Jul. 14, 2020", 20 pgs.

"U.S. Appl. No. 16/708,367, Examiner Interview Summary dated Jul. 31, 2020", 4 pgs.

"U.S. Appl. No. 16/708,367, Notice of Allowance dated Feb. 5, 2021", 12 pgs.

"International Application Serial No. PCT US2019 065301, International Preliminary Report on Patentability dated Jun. 17, 2021", 8 pgs.

"European Application Serial No. 19917963.1, Extended European Search Report dated Jan. 4, 2022", 8 pgs.

Raab, Stefan, "Proposal for unified control strategy for vertical take-off and landing transition aircraft configurations", AIAA Aviation Forum, Atlanta, Georgia, Applied Aerodynamics Conference, (Jun. 25-29, 2018), 22 pgs.

Thorsen, Adam T, "Development and Evaluation of a Unified Control Architecture for a Compound Rotorcraft in Maneuvering Flight", AIAA Aviation Forum, AIAA Atmospheric Flight Mechanics Conference, Washington, D.C., AIAA Paper 10.2514 6.2016-3392, (Jun. 13-17, 2016), 19 pgs.

"European Application Serial No. 19917963.1, Response Filed Jul. 25, 2022 Extended European Search Report dated Jan. 4, 2022", 13 pgs.

U.S. Appl. No. 16/708,367 U.S. Pat. No. 10,983,534, filed Dec. 9, 2019, Aircraft Control System and Method.

European Search Report for Application No. 15765064.9 dated Oct. 16, 2017.

International Search Report and Written Opinion for Application No. PCT/US10/46500 dated Apr. 13, 2011.

International Search Report and Written Opinion for Application No. PCT/US15/21344 dated Sep. 11, 2015.

International Search Report and Written Opinion for Application No. PCT/US15/21350 dated Sep. 15, 2015.

(56) References Cited

OTHER PUBLICATIONS

International Search Report and Written Opinion for application No. PCT/US20/030143 dated Dec. 8, 2020.
International Search Report and Written Opinion for application No. PCT/US20/052920 dated Dec. 9, 2020.
International Search Report and Written Opinion for application No. PCT/US20/29617 dated Jan. 12, 2021.
International Search Report and Written Opinion for Application No. PCT/US2017/059809 dated Jul. 31, 2018.
International Search Report and Written Opinion of the ISA for Application No. PCT/US2019/065293 dated Feb. 11, 2020.
International Search Report for Application No. PCT/US2019/065301, dated Aug. 31, 2020.
"Ailerons", NASA student page, 3 pages, Nov. 1, 2018, downloaded from: https://www.grc.nasa.gov/ww/k-12/airplane/alr.hltm.
"Airfolds Blade Profile", Mecaflux Heliciel, Propeller & Wing, https://www.heliciel.com/en/aerodynamique-hydrodynamique/profils%20aile%20profil%20pale.htm, (2019).
"Curtiss-Wright X-19", Wikipedia, https://en.wikipedia.org/wiki/Curtiss-Wright_X-19, (2021).
"Inclined Flat Plate", Aerodynamics of the airplane, Feb. 13, 2016.
International Search Report and Written Opinion for PCT Application No. PCT/US2019/039247 dated Sep. 13, 2019.
International Search Report and Written Opinion for PCT Application No. PCT/US2019035236 dated Aug. 20, 2019.
International Search Report and Written Opinion of the ISA dated Dec. 4, 2019 for PCT/US19/51565.
International Search Report and Written Opinion of the ISA dated Mar. 19, 2020 for PCT/US19/67618.
International Search Report and Written Opinion of the ISA, dated Jul. 24, 2019, for application No. PCT/US19/31863.
Berger, Tom, "Handling Qualities Requirements and Control Design for High-Speed Rotorcraft", Special Report FCDD-AMV-20-01, Feb. 2020, Combat Capabilities Devcom Aviation and Missile Center, U.S. Army, 360 pages.
Bevacqua, Mia, "Studies Show How to Modify HVAC Systems for Improved EV Range", https://m.futurecar.com/2301/Studies-Show-How-to-Modify-HVAC-Systems-for-Improved-EV-Range, May 27, 2018.
Carson, Biz, "First Look: Uber Unveils New Design For Uber Eats Delivery Drone", https:www.forbes.com/sites/bizcarson/2019/10/28/first-look-uber-unveils-new-design-for-uber-eats-delivery-drone/#1703f8d778f2, (2019).
Denham, Jr., James W., et al., "Converging on a Precision Hover Control Strategy for the F35B Stovl Aircraft", AIAA Guidance, Navigation and Control Conference and Exhibit Aug. 18-21, 2006, Honolulu, Hawaii, Abstract only.
Dollinger, Daniel, et al., "Control Inceptor Design for Remote Control of a Transition UAV", AIAA Aviation Forum 17-21 2019, Dallas, Texas, AIAA Aviation 2019 Forum, Paper 10.2514/6.2019-3268, 12 pages, (2019).
Falco, Gianluca, et al., "Loose and Tight GNSS/INS Integrations: Comparison of Performance Assessed in Real Urban Scenarios", Sensors (Basel) Feb. 2017; 17 (2): 225, https://www.ncbi.nlm.nih.gov/pmc/articles/PMC5335985/, (2017).
Gold, Phillip J., et al., "Design and Pilot Evaluation of the RAH-66 Comanche Selectable Control Modes", https://ntrs.nasa.gov/search.jsp?, N94-13322, pp. 419-431, Jul. 1, 1993.
Kang, Youngshin, et al., "Development of flight control system and troubleshooting on flight test of a tilt-rotor unmanned aerial vehicle", International Journal of Aeronautical and Space Sciences (IJASS), vol. 17 No. 1, 2016, pp. 120-131.
Kim, Tae, "Reduction of Tonal Propeller Noise by Means of Uneven Blade Spacing", University of California, Irvine, Thesis, publication date 2016.
Rabb, Stefan, et al., "Proposal of a Unified Control Strategy for Vertical Take-off and Landing Transition Aircraft Configurations", AIAA Aviation Forum, Jun. 25-29, 2018, Atlanta, Georgia, 2018 Applied Aerodynamics Conference, 22 pages.
Radhakrishnan, Anand, et al., "An Experimental Investigation of a Quad Tilt Rotor in Ground Effect", 21st Applied Aerodynamics Conference, Jun. 23-26, 2003, Orlando, Florida, AIAA 2003-3517, 11 pages.
Saraf, A. Amit Kumar, et al., "Study of Flow Separation on Airfoil with Bump", International Journal of Applied Engineering Research ISSN 09773-4562, vol. 13, No. 16 (2018), pp. 128686-12872.
Sullivan, Brenda M., et al., "A Subject Test of Modulated Blade Spacing for Helicopter Main Rotors", Presented at the American Helicopter Society 58th Annual Forum, Montreal, Canada, Jun. 11-13, 2002, http://ntrs.nasa.gov/search.isp.
Thorsen, Adam T., "Development of Evaluation of a Unified Control Architecture for a Compound Rotorcraft in Maneuvering Flight", AIAA Aviation Forum, AIAA Atmospheric Flight Mechanics Conference, Jun. 13-17, 2016, Washington, D.C., AIAA Paper 10.2514/6.2016-3392, 19 pages.
Vigano, Luca, et al., "Development of Augmented Control Laws for a Tiltrotor in Low and High Speed Flight Modes", 43rd European Rotorcraft Forum Proceedings, Sep. 12-15, 2017, Milan, Italy, vol. 1, pp. 438 to 451.
Walker, Gregory, et al., "F-35B integrated flight-propulsion control development", AIAA Aviation Forum, 2013 International Powered Lift Conference, Aug. 12-14, 2013, Los Angeles, CA, AIA Paper 10.2514/6.2013-4243, 16 pages.
Whittle, Richard, "Flying the Osprey is not dangerous, just different: Veteran pilots", Breaking Defense, Sep. 5, 2012, 9 pages, downloaded from: https://breakingdefense.com/2012/09/flying-the-osprey-is-not-dangerous-just-different-veteran-pilo/.
Yeh, Y.C. (Bob), "Triple-Triple Redundant 777 Primary Flight Computer", 1996, IEEE, pp. 293-307 (Year: 1996).
Young, Larry A., "Conceptual Design Aspects of Three General Sub-Classes of Multi-Rotor Configurations: Distributed, Modular, and Hetergenerous", NASA Ames Research Center, Moffett Field, CA 94035, Published 2015, Computer Science.
"Japanese Application Serial No. 2021-532378, Voluntary Amendment Filed Oct. 24, 2022", W English Claims, 13 pgs, dated Oct. 24, 2022.
"Japanese Application Serial No. 2021-532378, Notification of Reasons for Refusal mailed Dec. 6, 2022", w English Translation, 6 pgs, dated Dec. 6, 2022.
"Japanese Application Serial No. 2021-532378, Response Filed Mar. 1, 2023 to Notification of Reasons for Refusal dated Dec. 6, 2022", W English Claims, 7 pgs, (Year: 2023).
"Japanese Application Serial No. 2023-076185, Notification of Reasons for Refusal mailed Feb. 6, 2024", w English Translation, 4 pgs.

* cited by examiner

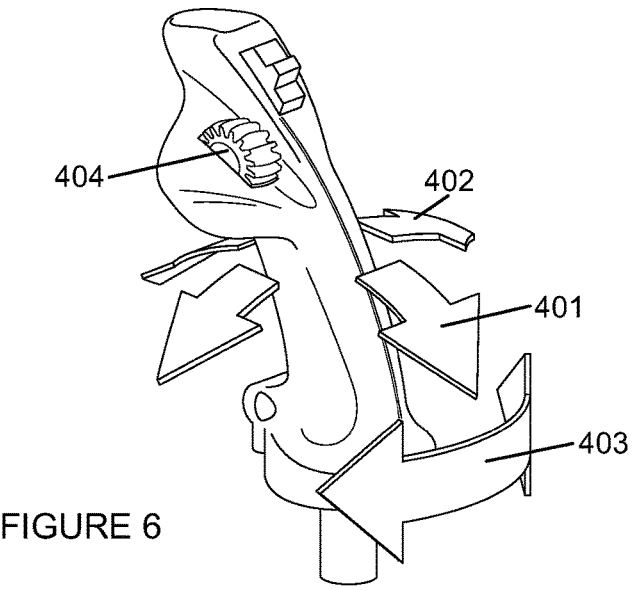

FIGURE 6

310

| Flight Regime | Single Inceptor axis mapping and response types - Lon. Unified | Single Inceptor axis mapping and response types - Lon. + Lat. Unified |
|---|---|---|
| Hover: | X - vertical rate<br>Y - lateral translational rate / acceleration<br>Z - heading rate (yaw)<br>A - longitudinal translational rate & acceleration<br>(B - deck angle) | X - vertical rate<br>Y - heading rate (yaw)<br>Z - lateral translational rate / acceleration<br>A - longitudinal translational rate & acceleration |
| Forward flight: | X - pitch rate/flightpath<br>Y - roll rate/flightpath<br>Z - sideslip<br>A - airspeed rate<br><br>FMS could configures aircraft to allow delta-flightpath (or equivalent) control for conventional landings. | X - pitch rate/flightpath<br>Y - roll rate/flightpath/heading rate<br>Z - sideslip<br>A - airspeed rate<br><br>FMS likely configures aircraft to allow delta-flightpath (or equivalent) control for conventional landings. |
| Ground operations: | Brake model uses forward stick X motion to command braking effort. (Button - Brake hold)<br><br>Z - steering*<br><br>A - Prop thrust, wheel motors | Brake model uses forward X motion to command braking effort. Button - Brake hold<br><br>Y - steering<br><br>A - wheel motors/prop taxi thrust |

FIGURE 7

AIRCRAFT CONTROL SYSTEM AND METHOD

CROSS-REFERENCE TO RELATED APPLICATIONS

This application is a divisional of U.S. application Ser. No. 16/708,367, filed 9 Dec. 2019, which claims the benefit of US Provisional Application number 62/776,870, filed 7 Dec. 2018, both of which are incorporated in their entirety by this reference.

This application is related to U.S. application Ser. No. 16/409,653, filed 10-May-2019, which is incorporated in its entirety by this reference.

TECHNICAL FIELD

This invention relates generally to the aviation field, and more specifically to a new and useful unified command system and method in the aviation field.

BACKGROUND

In the context of urban air mobility, tilt thrust (e.g., tilt-propeller, tiltrotor, etc.) aircraft have emerged as a desirable class of transport vehicle. Such aircraft can operate between multiple flight regimes, including hover regimes (e.g., analogous to helicopter flight), airplane regimes (e.g., fixed wing flight). Such multi-modal aircraft often present control challenges even to skilled pilots. Traditionally, tilt thrust aircraft are controlled such that the pilot maintains manual control over the overall tilt angle and the thrust commanded by one or more tiltable propulsion units. However, tilting the propulsion units changes the thrust from effecting vertical force (e.g., in a hover regime) to horizontal force (e.g., in an airplane regime), and the changing forces and moments upon the aircraft, as well as which axes the aircraft effectors effect, demand high cognitive workloads from pilots. In addition, urban air mobility contexts often include many short flights, which are disproportionately made up of transition periods (e.g., take off and/or landing) between flight regimes and thus exponentially increased pilot demands.

Thus, there is a need in the aviation field to create a new and useful unified command system and method. This invention provides such a new and useful system and method.

BRIEF DESCRIPTION OF THE FIGURES

FIG. 6 depicts an example inceptor and associated command axes used in relation to the unified command system and method.

FIG. 7 depicts a chart of example mappings between flight regimes and inceptor command axes.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
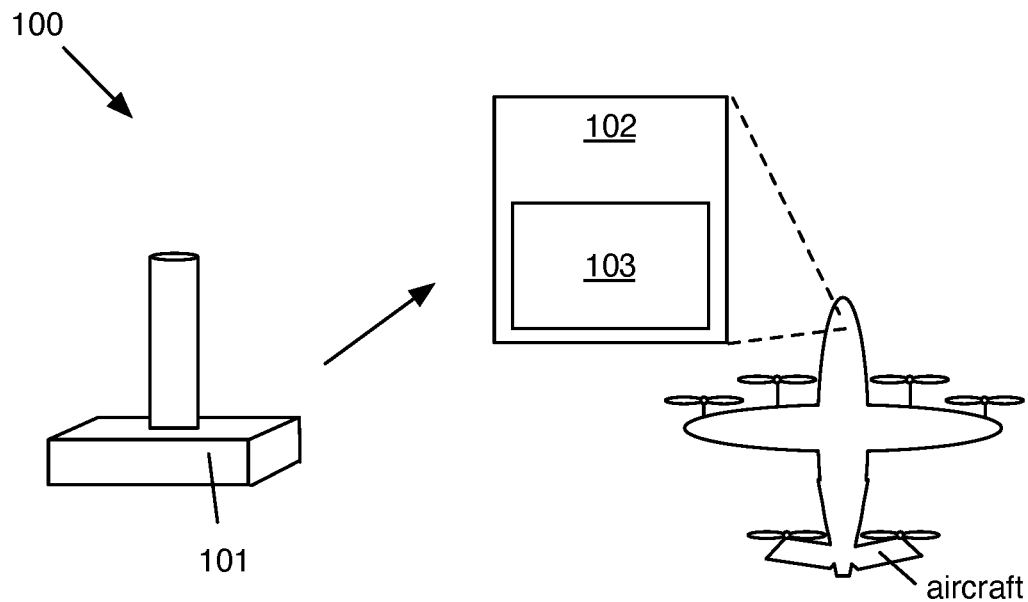
FIG. 1 is a schematic diagram of a unified command system.

As shown in FIG. 1, the unified command system 100 includes an input mechanism 101, a flight processor 102 that receives command input 104 from the input mechanism and translates the input into control output 105, and effectors 110 that are actuated according to the control output. The system can optionally include: one or more sensors, a vehicle navigation system which determines a vehicle state and/or flight regime based on data from the one or more sensors 120, and a vehicle guidance system which determines a flightpath for the aircraft. However, the unified command system 100 can additionally or alternatively include any other suitable components.

The unified command system 100 functions to enable a user 140 (e.g., pilot, non-pilot) to control output variables of aircraft operation (e.g., aircraft actions, speed, airspeed, groundspeed, flight path, etc.) independently of the flight regime in which the aircraft 130 is operating. The unified command system 100 can also function to: implement a command model 310 (e.g., a unified command model); select a combination of effectors and effector states (e.g., control surface positions, actuator power levels or positions, etc.) to achieve desired forces and moments on the airframe of the aircraft (e.g., as expressed by a user via an input mechanism); reduce the cognitive workload of the user; prevent modal confusion by providing consistent control mapping between flight regimes; and/or decouple control axes (e.g., to prevent undesired interplay during transition regimes or other flight regimes). However, the unified command system 100 can additionally or alternatively have any other suitable function that facilitates aircraft operation.

Figure 2:
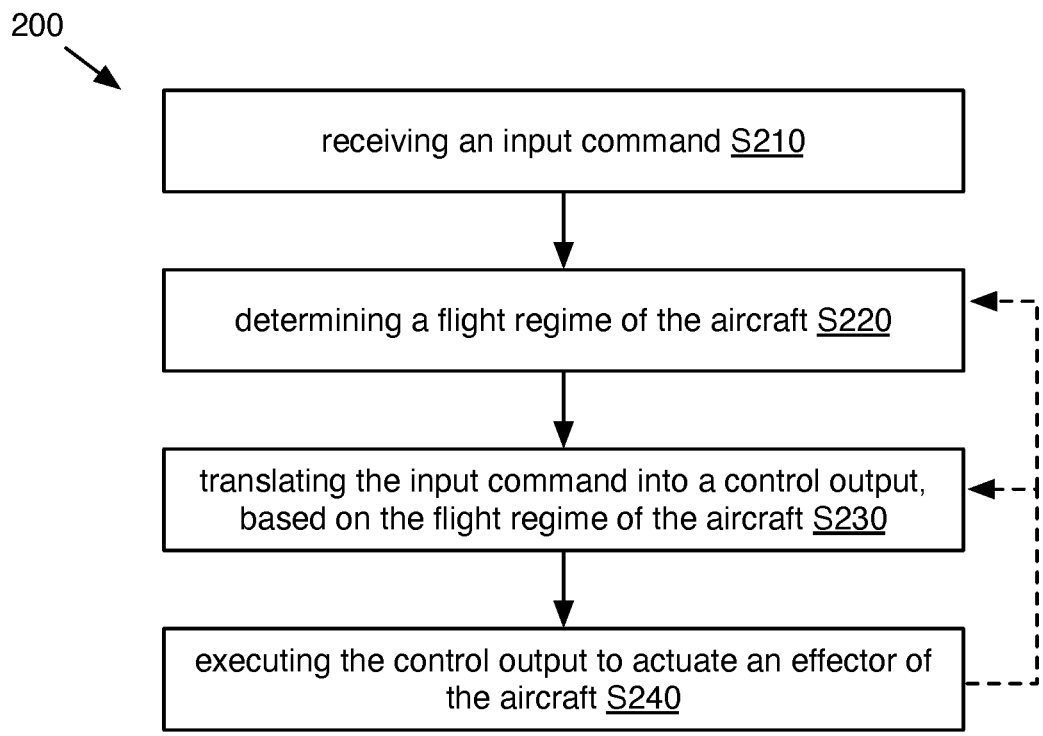
FIG. 2 is a flowchart diagram of a unified command method.

As shown in FIG. 2, the unified command method 200 includes: receiving an input command S210; determining a flight regime of the aircraft S220; translating the input command into a control output, based on the flight regime of the aircraft S230; and, executing the control output to actuate an effector of the aircraft S240.

The unified command method 200 functions to translate user commands related to the desired output variables of aircraft operation (e.g., aircraft actions, airspeed, groundspeed, flight path, etc.) into effector states (e.g., positions, power levels, etc.) according to a unified command model. The unified command method 200 can also function to: execute the functionality of a unified command system analogous to the unified command system 100 described herein; select a combination of effectors and effector states (e.g., control surface positions, actuator power levels or positions, etc.) to achieve desired forces and moments on the airframe of the aircraft (e.g., as received from a user via an input mechanism); reduce the cognitive workload of the user; prevent modal confusion by providing consistent control mapping between flight regimes; and/or decouple control axes (e.g., to prevent undesired interplay during transition regimes or other flight regimes). The unified command method 200 can additionally or alternatively have any other suitable function.

2. Benefits

Variations of the technology can afford several benefits and/or advantages.

Figure 5A:
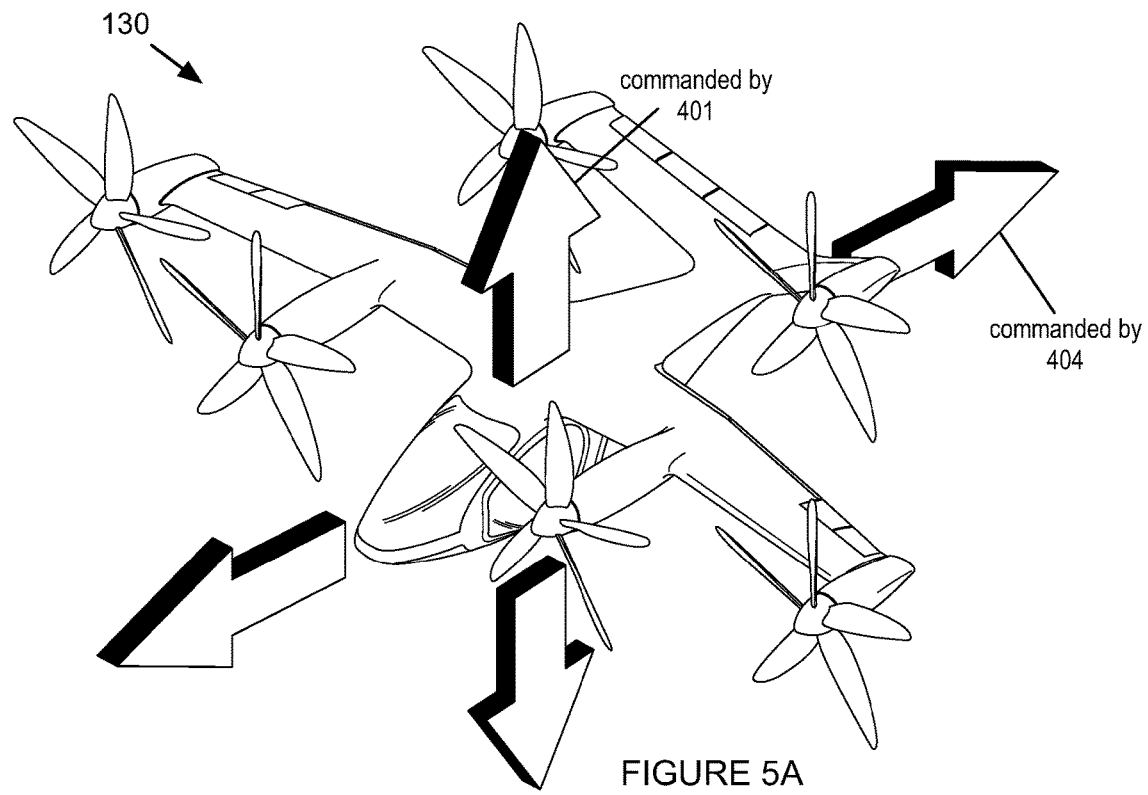
FIG. 5A depicts an example aircraft used in relation to the unified command system and method, configured for a forward flight regime, with associated motion axes and command axes.
Figure 5B:
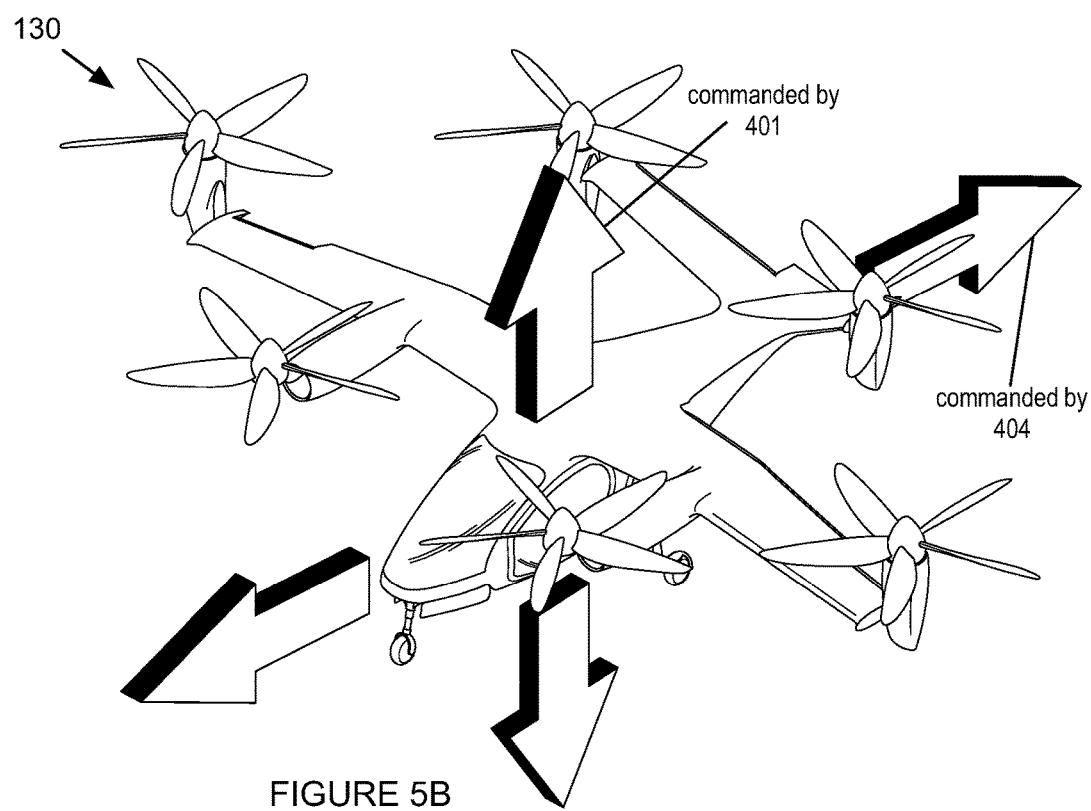
FIG. 5B depicts an example aircraft used in relation to the unified command system and method, configured for a hover flight regime, with associated motion axes and command axes.

First, variations of the technology can eliminate, prevent, and/or mitigate modal confusion, which includes situations wherein a user is attempting to command the aircraft with an incomplete or incorrect conception of the flight regime (e.g., "mode") in which the aircraft is operating. Such variations can reduce user cognitive workload by providing a consistent mapping between user inputs (e.g., commands, demands, etc.) and desire aircraft response (e.g., flightpath, pitch, roll, yaw, attitude, etc.) independently of the flight regime, which can be achieved by allowing the user to command aircraft response rather than effector positions. The system and/or method can automatically determine the actuator control instructions to achieve the desired aircraft response based on: current sensor measurements, vehicle state (e.g., current flight regime, aircraft position in all degrees of freedom), actuator feedback, and/or a set of rules (e.g., flight envelope protections, operational limits, performance protection). As shown in FIGS. 5A-5B, the user commands (as depicted by the colored arrows) are related to the aircraft axes and motions associated therewith, irrespective of the flight regime of the aircraft (e.g., forward flight as shown in FIG. 5A or hover as shown in FIG. 5B); variations of the technology enable the same control input by the user to result in motion along the same axes in both flight regimes, even as the set of effectors, power levels, trim levels, and other flight operational parameters change between flight regimes (e.g., without surfacing these parameters to direct user control). This can, in examples, improve operational safety of the aircraft (e.g., by eliminating or reducing unsafe instances of modal confusion by the user), allowing the user to focus on aeronautical decision making and not performing the additional cognitively demanding tasks of managing tilt, thrust, and other effector states directly.

Second, variations of the technology can minimize the number of input mechanisms managed by the user during flight, while maintaining a suitable level of user cognitive workload. In variants, aircraft will lack direct human controls for: power (throttle, propeller control), aircraft configuration (tilt, flaps, landing gear), aircraft control (trim, rudder pedals, brake pedals). For example, variants of the system which minimize the number of input mechanisms managed by the user can include a single inceptor that is operable across various flight regimes without altering the input axes in which the user inputs commands (e.g., via dynamic remapping between input axes and effector states based on flight regime). A single inceptor can also advantageously reduce mass, system complexity, and aid in ingress and egress from the aircraft.

Third, variations of the technology can facilitate single-user operation in complex environments and situations. The cognitive workload of the unified command system and method can be tailored to specific tasks: for example, the workload can be adapted to single-user operation of a VTOL-capable aircraft in urban environments (e.g., without the nominal workload substantially exceeding nor falling substantially short of such tasks, to prevent overwork and boredom/disengagement). The cognitive workload can also be oriented toward aeronautical decision making (e.g., which aircraft actions should be commanded) instead of technical decision making (e.g., which aircraft effectors should be in which effector states).

Fourth, variations of the technology can minimize operational errors. The command system and/or method can apply protections on the command and/or control scheme so that the aircraft will not: stall, spin, overstress a component, collide with a hazard (and/or the ground), or otherwise perform undesirably. In variants, performance protections can include flight envelope protections or other protections in one or more regimes of flight. Performance protections can include: overspeed, stall, bank angle, and/or other protections in a forward regime of flight; vertical descend rate, height above ground level (AGL), sideslip, overswing angle protections in a hover regime of flight; stall, structural, aerodynamic-load, vertical rate, AGL, and/or other protections in a transition regime of flight; and/or other protections. Command and/or control protections can allow the user to achieve higher performance out of an aircraft without worrying about these conditions, which can increase the operational efficiency of the aircraft, enabling faster take-offs, landings, and transitions between forward flight and hover. In variations, a geo-brake can further minimize operational errors by allowing braking relative to the ground as a reference frame (e.g., when the aircraft is airborne). This can further reduce the likelihood of operational errors because it streamlines the command inputs required to respond to undesirable flight conditions or ground hazards by allowing the aircraft to slow and/or stop relative to the ground. In variants, the geo-brake can be activated by a user input command and/or independently of a user input (e.g., automatically, based on one or more sensor measurements). In variants, the geo-brake avoids overshoot in stopping control, which can result in the aircraft going in the opposite direction. In variants, the geo-brake is resilient to wind and/or other ambient factors which could result in aircraft motion relative to the ground.

Figure 17A:
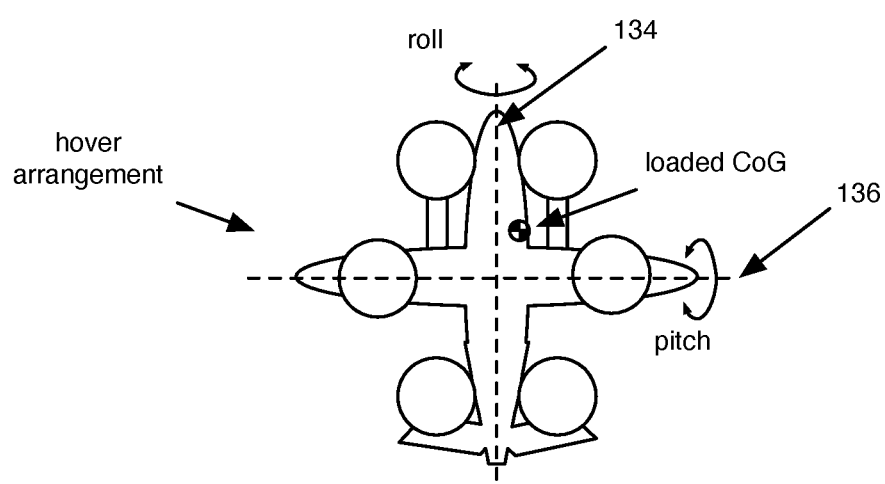
FIGS. 17A-B depict an example of the primary aircraft axes relative to an example loaded center of gravity in the hover arrangement and forward arrangement, respectively.
Figure 17B:
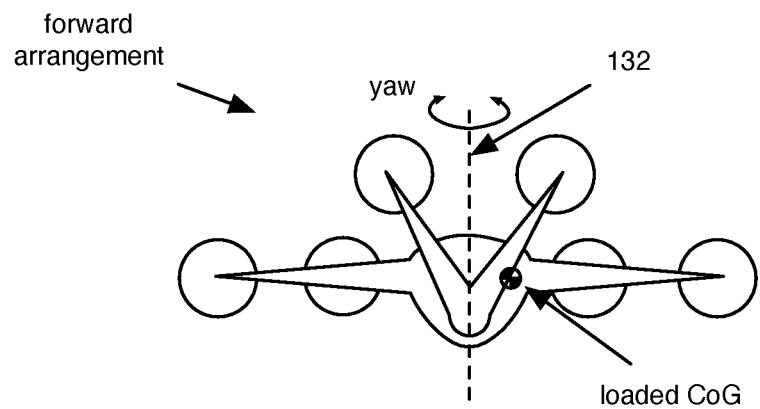

Sixth, variations of this technology offer improved ride comfort. In variations, the deck attitude of the aircraft is trimmable about the roll axis (lateral angle with the ground) and/or pitch axis (longitudinal angle with the ground). This allows the aircraft to be stable and comfortable for passengers despite asymmetric weight distribution (e.g., CoG offset from an aircraft geometric center) resulting from:

luggage, uneven passenger weight distribution, variable ambient conditions, and/or other factors. The weight distribution is preferably the overall weight distribution of the loaded aircraft (e.g., relative to a projection of the aircraft onto a reference plane, relative to an area cooperatively defined by lift-generating mechanisms of the aircraft, relative to a lift distribution across the aircraft, in the plane defined by the longitudinal axis and the lateral axis, etc.), but can additionally or alternatively be the weight distribution of the load within the aircraft, and/or any other suitable weight distribution. An example of an asymmetric CoG is shown in FIGS. 17A-B. In variants, the deck attitude can be automatically and/or manually adjusted relative to the ground (e.g., automatically levelled), controlled by a user input command, and/or otherwise commanded/controlled. In variants, deck pitch attitude can be decoupled (or partially decoupled) from longitudinal control (e.g., in a hover and/or transition configuration), which can improve ride comfort and quality by reducing/eliminating seeming "unsteady" pitch motions. In a specific example, longitudinal control can be controlled by adjusting the tilts (e.g., instead of pitch attitude changes), which can keep the fuselage level at a predetermined attitude. In a related specific example, pitch can be used as an auxiliary control means for longitudinal control. In variants, the aircraft allows multi-axis step control (e.g., velocity control, position control) in the hover regime of flight, which allows smooth and efficient maneuvers in the hover regime of flight—where orienting the aircraft is most critical. This can improve flight efficiency, ride comfort, and turnover time between flights.

However, variations of the technology can additionally or alternatively provide any other suitable benefits and/or advantages.

3. System 3.1 Aircraft

Figure 14:
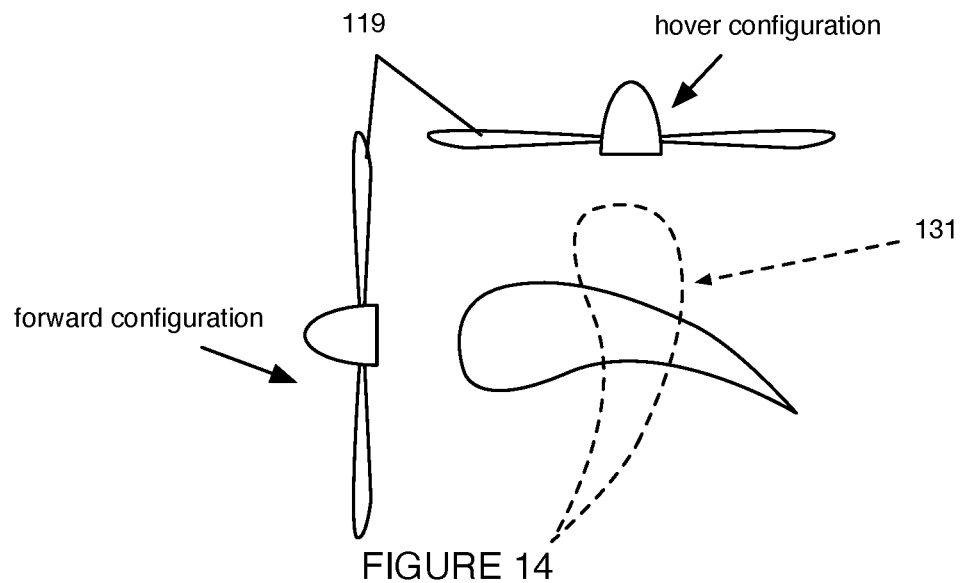
FIG. 14 depicts an example of the forward and hover configurations of a rotor relative to a wing.
Figure 15:
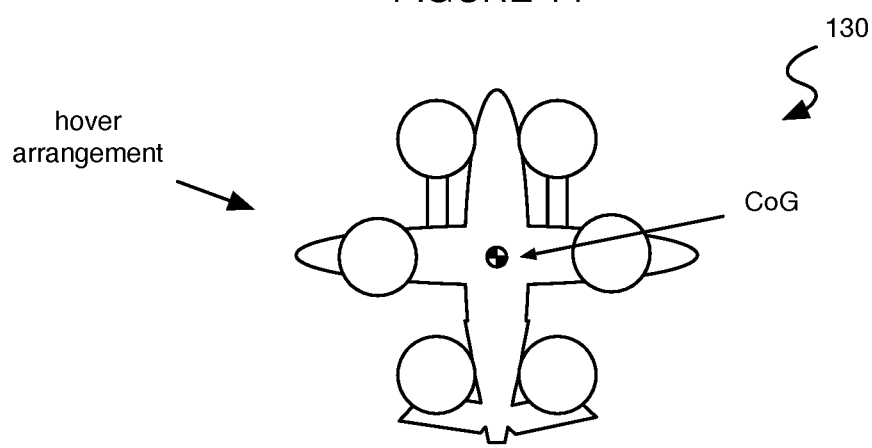
FIG. 15 depicts an example of an aircraft in the hover arrangement.
Figure 16:
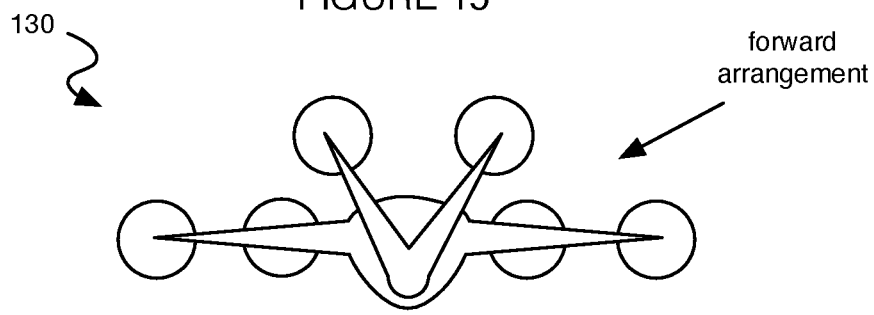
FIG. 16 depicts an example of an aircraft in the forward arrangement.

The unified command system is preferably implemented in conjunction with an aircraft (e.g., the system can include an aircraft, the system can be integrated with an aircraft, etc.). In particular, the aircraft is preferably a rotorcraft, but can additionally or alternatively include any suitable aircraft (such as a tiltwing aircraft 131 as shown in the example in FIG. 14, jet aircraft, etc.). The rotorcraft is preferably a tiltrotor (or tilt-prop) aircraft with a plurality of aircraft propulsion systems 118 (e.g., rotor assemblies, rotor systems, etc.), operable between a forward arrangement (an example is shown in FIG. 16) and a hover arrangement (an example is shown in FIG. 15). However, the rotorcraft can alternatively be any other suitable rotorcraft or vehicle propelled by rotors. The rotorcraft preferably includes an all-electric powertrain (e.g., battery powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain. The aircraft can have any suitable mass (e.g., unloaded mass, loaded mass, maximum takeoff mass, etc.) with any appropriate mass distribution (or weight distribution). The aircraft mass can be: 1 kg, 5 kg, 10 kg, 50 kg, 100 kg, 500 kg, 1000 kg, 1250 kg, 1500 kg, 1750 kg, 2000 kg, 2250 kg, 2500 kg, 2750 kg, 3000 kg, 5000 kg, 1000 kg, 20000 kg, less than 1500 kg, 1500-2000 kg, 2000-3000 kg, 3000-5000 kg, 5000-10000 kg, greater than 10000 kg, and/or any other appropriate mass.

The term "rotor" as utilized herein, in relation to the control system or otherwise, can refer to a rotor, a propeller, and/or any other suitable rotary aerodynamic actuator 119. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, a thrust-vectoring aircraft, and/or otherwise suitably referred to or described.

Figure 3:
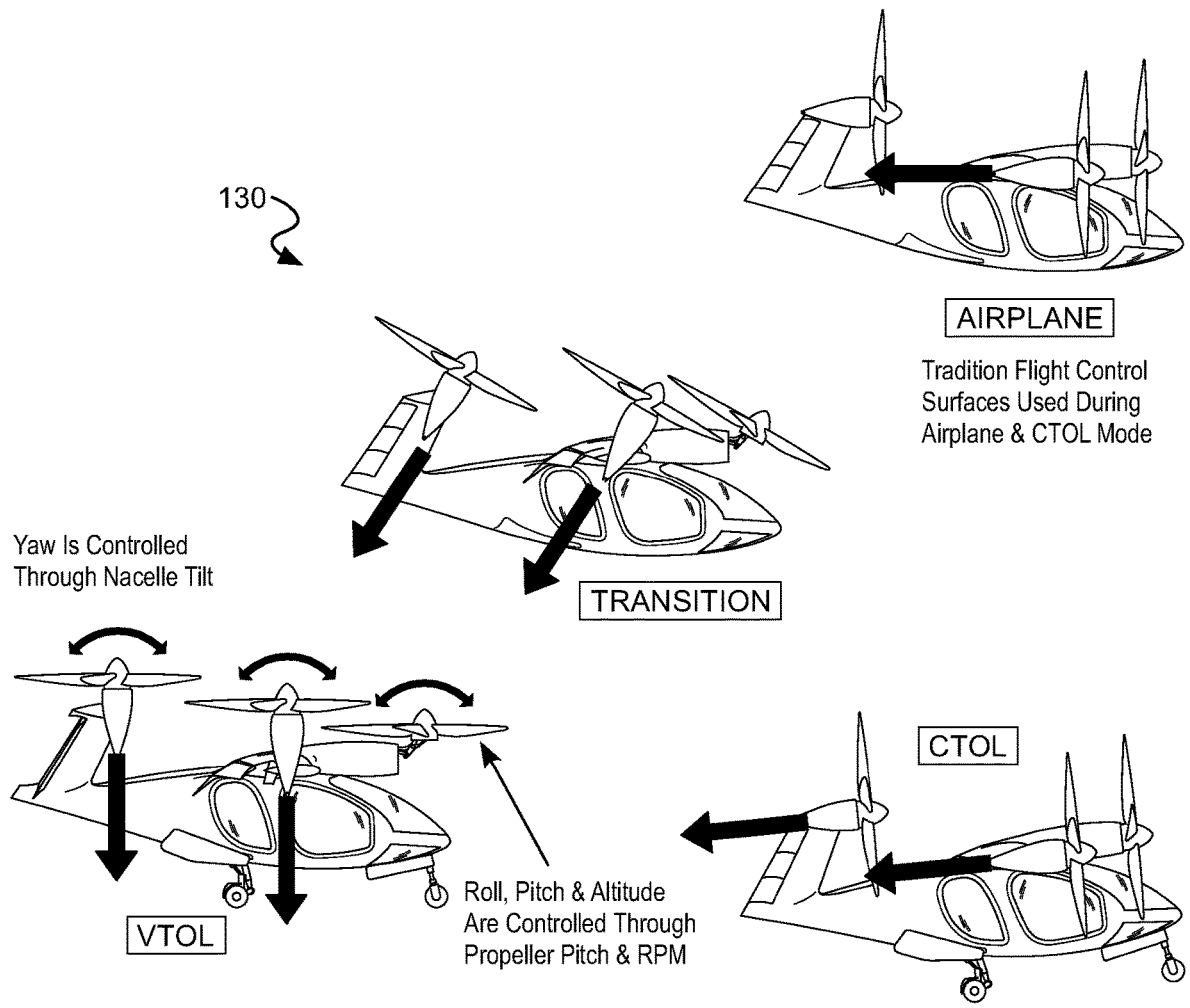
FIG. 3 depicts various flight regimes of aircraft operation, in relation to the unified command system and method.

The system 100 and method 200 can be used in relation to various flight regimes of the transition aircraft (e.g., tilt-prop aircraft, tiltrotor aircraft, tilt thrust aircraft, etc.). The flight regimes are each associated with a set of aircraft effectors that aerodynamically control the forces and moments on the aircraft, and the set of aircraft effectors can vary among the various flight regimes. For example, forward flight as an airplane can be largely a flightpath vectoring task wherein airplane attitude is largely coupled to the flightpath, as compared to hover which can be largely a horizontal positioning task with a vertical control component, wherein the aircraft attitude is substantially less coupled to the flightpath vector. The system and method function to automatically determine the set of effectors and effector states associated with a commanded aircraft maneuver or action demanded by the user (e.g., such that the user does not need to devote cognitive energy to identifying and commanding the set of effectors directly). As shown in FIG. 3, these flight regimes can include: vertical takeoff and landing (VTOL) or hover, wherein the aircraft yaw is controlled through nacelle tilt, and aircraft roll, pitch, and attitude are controlled through propeller pitch and motor RPM; conventional takeoff and landing (CTOL) and airplane, wherein traditional flight control surfaces are used to control the aircraft yaw, roll, pitch, and attitude (e.g., flaps, ruddervators, ailerons, propeller thrust, etc.); and transition (e.g., between forward flight as an airplane and hover or vice versa), wherein the thrust (e.g., blade pitch and motor RPM), propeller unit tilt angle, and control surfaces are used in a dynamically adjusted manner during conversion between airplane and hover flight.

In a first variant, the aircraft is a tiltrotor aircraft operable between a hover regime, wherein a plurality of propulsion assemblies is arranged in a hover arrangement, and a forward regime, wherein the plurality of propulsion assemblies is arranged in a forward arrangement. The hover arrangement defines the position of each propeller of the plurality of propulsion assemblies relative to each other propeller of the plurality of propulsion assemblies and the airframe during aircraft operation in the hover regime, and the forward arrangement likewise defines the relative position of each propeller to each other propeller and the airframe during operation in the forward regime. The airframe can include a left wing, a right wing, a fuselage, and an empennage, wherein the left and right wings are coupled to the fuselage and positioned between forward of the empennage. Each propulsion assembly includes a propeller, a tilt mechanism, and an electric motor. Each propulsion assembly is operable, preferably by the tilt mechanism associated therewith but alternatively in any other suitable manner, between a hover configuration and a forward configuration as described in further detail below. The tiltrotor aircraft can additionally include an electric power source, flight control surfaces and actuators, and any other suitable components.

The tiltrotor aircraft functions to provide an aerial vehicle that is stable in hover regime (e.g., maximally stable, stable within a defined stability window or envelope of flight conditions, stable up to a stability threshold magnitude of various control inputs to the aircraft, etc.) and efficient (e.g., aerodynamically efficient, power efficient, thermodynamically efficient, etc.) in forward regime. The tiltrotor aircraft can also function to provide airborne transportation to passengers and/or cargo. However, the tiltrotor aircraft can additionally or alternatively have any other suitable function.

The tiltrotor aircraft defines a center of gravity (CoG). The center of gravity is preferably a point in three-dimensional space from which the weight of the tiltrotor aircraft 100 can be considered to act, but can alternatively be a defined as a region having a finite volume, a set of points defining the CoG in various aircraft loading configurations, and/or be otherwise suitably defined. The center of gravity can depend upon the state or arrangement of mass of the aircraft (e.g., loaded vs. empty, the weight distribution of cargo and/or passengers, the tilt configuration of the propellers, etc.), and references to the CoG herein preferably refer to the aircraft CoG in an unloaded state (e.g., empty state) and in the hover arrangement of the plurality of propellers, but can additionally or alternatively refer to a loaded state, a forward-arranged state, a hover-arranged state, and any other suitable state of the aircraft.

The tiltrotor aircraft defines various geometrical features. The tiltrotor aircraft defines principal geometric axes, as shown in FIGS. 17A-17B, including: a vertical axis 132 (e.g., yaw axis), a longitudinal 134 axis (e.g., a roll axis), and a lateral axis 136 (e.g., a pitch axis). The vertical, longitudinal, and lateral axes can be defined such that they intersect at the CoG of the aircraft, and a pure moment about any one of the aforementioned axes causes the aircraft to rotate about the vertical, longitudinal, and lateral axes, respectively. However, the three principal axes can additionally or alternatively be defined geometrically (e.g., based on lines of symmetry of the aircraft in one or more dimensions, based on arbitrary lines through the aircraft, etc.) with or without reference to the CoG. For example, the axes can intersect at a geometric center of the aircraft.

The propellers of the tiltrotor aircraft each define a disc area centered at the axis of rotation of the propeller, and the disc area is contained by an infinite disc plane extending away from the axis of rotation. In variations of the aircraft, the disc planes of each of the plurality of propulsion assemblies can be coextensive with any suitable subset of the remainder of the plurality of propulsion assemblies. In a first example, each disc plane can be coextensive with each other disc plane in the hover configuration of a first variation. In a second example, each disc plane can be coextensive with the disc plane of one other propulsion assembly symmetrically across the longitudinal axis of the aircraft and displaced from the disc planes of each other propulsion assembly. However, the disc planes of the plurality of propulsion assemblies can be otherwise suitably arranged relative to one another.

The tiltrotor aircraft functions to provide an aerial vehicle operable between a hover regime (e.g., rotary-wing mode) and a forward regime (e.g., fixed-wing mode). The hover regime can include vertical takeoff, vertical landing, and/or substantially stationary hovering of the aircraft; however, the hover regime can additionally or alternatively include any suitable operating regime wherein vertically-directed thrust is generated by one or more of the plurality of propulsion assemblies. The forward regime can include forward flight, horizontal takeoff, and/or horizontal landing of the aircraft (e.g., conventional take-off and landing/ CTOL); however, the forward regime can additionally or alternatively include any suitable operating regime wherein horizontally-directed thrust is generated by one or more of the plurality of propulsion assemblies.

The tiltrotor aircraft is operable between a plurality of regimes, including a hover regime and a forward regime. In the hover regime, the plurality of propulsion assemblies can be arranged in the hover arrangement. In the hover arrangement, each of the plurality of propellers is preferably arranged in the hover configuration. In the forward regime, the plurality of propulsion assemblies can be arranged in the forward arrangement. In the forward arrangement, each of the plurality of propellers is preferably arranged in the forward configuration. However, each of the plurality of propellers can be arranged in any suitable configuration between the forward and hover configurations, independently of one another, and/or in any suitable orientation in the hover regime of aircraft operation. Furthermore, each of the plurality of propellers can be arranged in any suitable position between the forward and hover configurations, independently of one another, and/or in any other suitable orientation in the forward regime of aircraft operation. Furthermore, the tiltrotor aircraft can be operated in any suitable transition regime between the hover regime and forward regime, wherein a component of thrust generated by one or more propulsion assemblies is directed along both the vertical axis and the longitudinal axis (e.g., and/or the lateral axis).

Figure 4A:
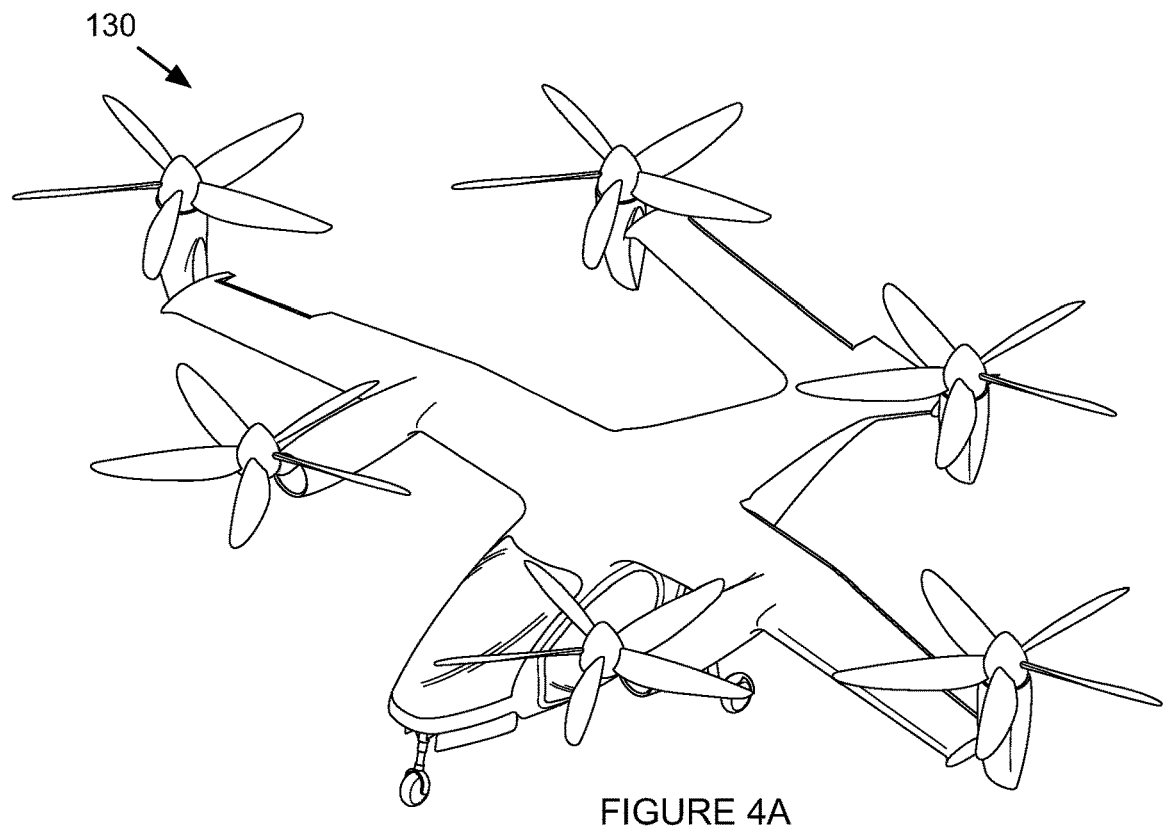
FIG. 4A depicts an example aircraft used in relation to the unified command system and method, configured for a hover flight regime.
Figure 4B:
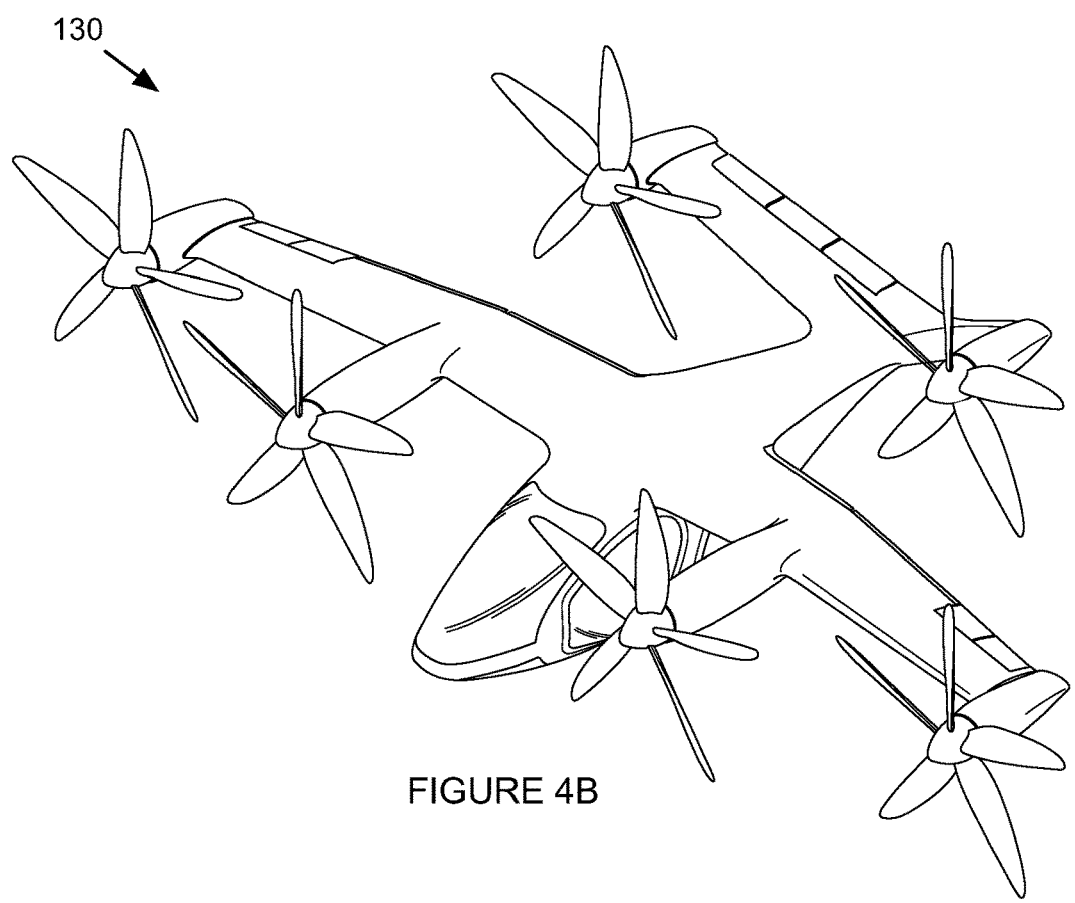
FIG. 4B depicts an example aircraft used in relation to the unified command system and method, configured for a fixed-wing flight regime.

In a first specific example of the unified command system 100, the system includes an electric tiltrotor aircraft (e.g., as shown in FIGS. 4A-4B) including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

In a second specific example, the tiltrotor aircraft is the tiltrotor aircraft described in U.S. application Ser. No. 16/409,653, filed 10-May-2019, which is incorporated in its entirety by this reference. In this example, the system can include: one or more tilt mechanisms, rotor blade actuation mechanisms, and/or other components described by this reference, configured in the same geometric arrangement or a different geometric arrangement than described in this reference. In this example the tiltrotor aircraft includes: an airframe and a plurality of propulsion assemblies coupled to the airframe.

3.2 Unified Command System

As shown in FIG. 1, the unified command system 100 includes an input mechanism, one or more sensors, a flight processor that translates the input into control output, and effectors that are actuated according to the control output. However, the unified command system 100 can additionally or alternatively include any other suitable components.

The input mechanism functions to receive command input (input command) from a user of the aircraft. The command input is preferably indicative of a desired flightpath, and decomposed into "longitudinal" (e.g., X-axis, fore/aft, etc.) aspects of the desired flightpath, "lateral" (e.g., Y-axis, left/right, etc.) aspects of the desired flightpath, and "vertical" or "normal" (e.g., Z-axis, up/down, etc.) aspects of the desired flightpath. However, the command input can additionally or alternatively be indicative of any other suitable aircraft action.

The input mechanism can include one or more inceptors, a display, and any other suitable interface components. In a specific example, the inceptor can be the only manual control input in the cockpit or aircraft. However, other control inputs (e.g., pedals, buttons, secondary inceptors, etc.) can optionally be included in the aircraft.

The input mechanism (and/or user) can be onboard the aircraft, remote (e.g., remotely piloted aircraft), and/or otherwise implemented.

In variations, interface components can provide feedback to the user (e.g., feedback indicative of the state of aircraft, limits on command input, etc.). Feedback can be provided haptically (e.g., through an inceptor, through other components in contact with the user such as the seat, etc.), audibly (e.g., via an audio alert or message), visually (e.g., via a displayed alert, a light, etc.), and/or otherwise suitably provided. Feedback can include information and/or alerts related to: the vehicle state, the performance protection(s), the regime of the aircraft, and/or any other appropriate information.

In variations, the input mechanism can additionally or alternately automatically connect and/or disconnect the aircraft autopilot 160. In a first example, autopilot is automatically disconnected in response to the input mechanism receiving a user input. In a second example, autopilot is automatically engaged in response to a neutral positioning of the input mechanism (and/or lack of a user input for a threshold period of time). In a third example, autopilot is engaged by receipt of a designated input by the input mechanism (e.g., pushing an autopilot button).

The input mechanism can be coupled to the flight processor in an indirect, "fly-by-wire" manner, such that no primary control of the effectors is available to the user (e.g., all direct effector control is generated by the flight processor in response to received command input from the input mechanism). Alternatively, the input mechanism can include direct connections (e.g., primary control) to one or more effectors, and/or any suitable combination of direct and indirect connections.

The inceptor functions to receive command input in the form of physical departures of the inceptor position from a neutral position.

One or more axes/inputs of the inceptor can include a dead zone, which functions for avoid processing small departures from the neutral position (e.g., related to mechanical or sensor bias). Dead zones can be symmetric or asymmetric ranges about the neutral position. Dead zones can be pre-determined, dynamically determined, configured by the user/pilot, and/or otherwise implemented. Dead zones can be 0.5%, 1%, 5%, 10%, 30%, 50%, or any suitable proportion of each axis.

Physical departures of the inceptor pose (e.g., from a neutral pose, from a prior pose), are preferably mapped to input commands. One or more physical departure parameters (e.g., distance, angular offset, rate of change, acceleration, etc.) of the inceptor pose are preferably mapped to input commands on a per-axis basis, but can additionally or alternatively be mapped based on a combination of axes or otherwise mapped.

The inceptor can be self-centering (returning to a neutral position by default), not self-centering (remain in a departed position), or otherwise suitably implemented. The inceptor can provide force feedback (e.g., dynamically resist motion in one or more axes, vibrate, etc.), no force feedback, be configurable to provide force feedback (e.g., by a user/pilot), or otherwise operate.

The physical departures of the inceptor can be decomposed in space between X-axis 401, Y-axis 402, Z-axis 403, and A-axis 404 motions as shown by example in FIG. 6; however, the physical departures from a neutral position can be otherwise suitably decomposed. The fly-by-wire coupling between the inceptor and the flight processor (e.g., and the effectors by way of the flight processor) can enable an inceptor having 2 or more independent axes to be used without complex mechanical flight control linkages between the inceptor and aircraft effectors (e.g., which can limit the number of aircraft motion axes and associated effectors each inceptor can practically control).

In variations, the input mechanism can include two inceptors (e.g., wherein helicopter-analogous actions are associated with a right-hand inceptor, wherein airplane-analogous actions are associated with a left-hand inceptor, vice versa, etc.). In another example, the system can include two inceptors, wherein a first inceptor is operable in a first flight regime (e.g., hover) and the second inceptor is operable in a second flight regime (e.g., airplane), and both inceptors are operable (e.g., in a redundant manner, in a non-redundant manner, etc.) in a transition flight regime. In additional or alternative variations, the unified command system can have a single inceptor. However, the input mechanism can additionally or alternatively include any suitable number of inceptors.

Inceptor(s) can be left-handed (e.g., designed to engage left hand of user, positioned on the left of the user), right-handed, two-handed, symmetric (e.g., operated with either hand), and/or otherwise configured.

In variants, the display functions to provide feedback and/or other information related to vehicle state to the user. The display can be a touchscreen display, LCD, LED, HUD, and/or other display. In variants including a touchscreen display, the touchscreen can optionally operate as part of the input mechanism, including one or more input axes (e.g., touch-operated sliding scale), buttons, or other inputs.

The input mechanism can include other additional interface components serving as inputs related to one or more aircraft command functionalities, such as: binary inputs, input axes, verbal inputs, and/or other input mechanisms. Binary inputs can be: push-buttons, switches, and/or other inputs. Input axes (e.g., A-axis, thrust axis) can be: triggers, thumb wheels, rollers, joysticks, levers, foot pedals, sliders, and/or other input axes. Examples of verbal inputs include: "Tune San Jose Approach to Standby," "Check weather at Palo Alto," "MFD Home," "Autopilot Level," air traffic communications, location requests, weather requests, display requests, autopilot requests, tele-communications requests and/or other types of requests. Additional interface components can be located in any appropriate position about the aircraft.

Preferably, additional interface components are located on an inceptor and/or on a touchscreen display, but can be located on any appropriate face or surface. In a first variant, additional interface components are located on the top/side of the inceptor(s) or are persistent on a touchscreen during one or more regimes of flight (e.g., accessible in all regimes of flight, hover only, forward only, taxiing only). Alternately, additional interface components can be: located on a side of the user opposing the inceptor (e.g., left-hand side with a right-hand inceptor, right-hand side with a left-hand inceptor), same side as the inceptor, overhead of the user, in a foot well (e.g., pedal, proximate to feet for 5% height female and proximate to feet for 95% height male), on co-pilot side only, on pilot side only, on the dashboard, proximal to one or more passenger seats (relative to the pilot seat), and/or otherwise located.

In a first example, a set of buttons is located on the inceptor in a D-pad arrangement.

In a second example, additional interface components command trimming a deck attitude of the aircraft about the roll axis (lateral angle relative to the ground) and/or pitch axis (longitudinal angle relative to the ground).

In a third example, additional interface components command a geo-brake.

In a fourth example, additional interface components command a step input for the aircraft. The step input can be a lateral and/or longitudinal step in any appropriate regime of flight (forward, hover, transition, and/or taxi). The additional interface component(s) commanding the step input(s) can be a D-pad style button and/or be otherwise configured.

In a fifth example, the additional interface component can be related to ground operations such as: powering taxi (e.g., via rotors or wheels), taxi steering, landing gear deployment, opening a tele-communications link, and/or otherwise operate.

The flight processor functions to receive command input from the input mechanism and optionally, the one or more sensors, and functions generate control output(s) to affect the state of one or more effectors of the aircraft (e.g., to control the aerodynamic forces and/or moments on the aircraft). The flight processor also functions to implement a unified command model that translates the inputs into desired aircraft responses 106 based on the flight regime 107 in which the aircraft is operating (example shown in FIG. 10), wherein the desired aircraft responses 106 can be used to determine the control outputs. The flight processor also functions to implement a control engine 320 to generate control outputs based on the desired aircraft responses and the vehicle state. The flight processor can also function to receive input from a vehicle navigation system 150 (e.g., vehicle state 108, flight regime 107, effector state, existing forces and/or moments on the aircraft, etc.). The flight processor can optionally function to determine the flight regime in which the aircraft is operating (e.g., based on received vehicle state, based on a predetermined regime selection, based on the current portion of the flight plan, etc.). Alternatively, the flight regime can be determined by the vehicle navigation system and included in the input received at the flight processor from the vehicle navigation system.

Inputs to the flight processor can include user input (e.g., command input) and vehicle state variables (e.g., aircraft position, aircraft positional change rates, forces on the aircraft, moments on the aircraft, speed, airspeed, groundspeed, etc.), guidance inputs (e.g., autopilot commands, waypoints, trajectory plans, flightpath, etc.), the current flight regime, and any other suitable inputs. Outputs (control outputs) from the flight processor can include target effector positions (e.g., angular positions of control surfaces, drive power for effector actuators, encoder states for effector actuators, etc.), and any other suitable outputs. The inputs are translated into outputs collectively by the command model and the control engine executing at the flight processor.

Variants of the system can include a plurality of flight processors. In a first example, the system (e.g., aircraft) includes three or more flight processors, each executing the command model and the control engine. In a second example, the command model is executed on a first set of flight processors and the control engine is executed on a second set of flight processors. The flight processor(s) can include multiple processing elements aggregated or distributed about the aircraft in any appropriate manner.

Figure 10:
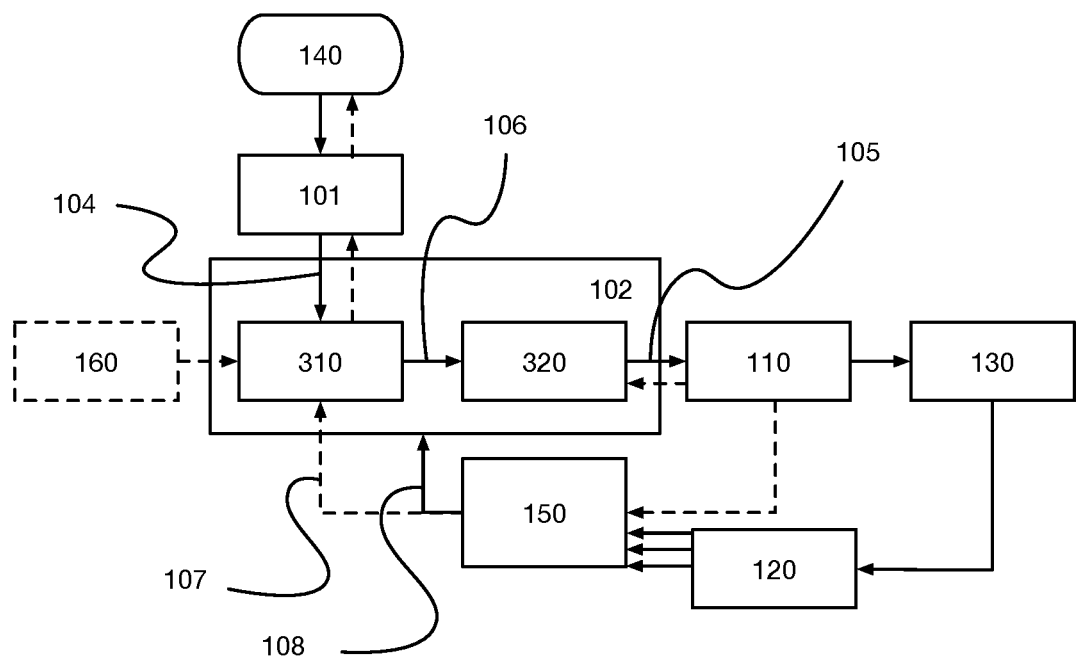
FIG. 10 is a schematic diagram of a unified command system variant.

The flight processor functions to translate command inputs into desired aircraft responses 106 based on the current flight regime 107 (example shown in FIG. 10).

The command input functions to convey a desired aircraft response. The command input is preferably received from a user at an input mechanism, but can additionally or alternatively be received from an autonomous agent, or any other suitable source.

A command input preferably includes an input parameter associated with a control axis, but can additionally or alternatively be a button press, a verbal command, or any other suitable input.

An input parameter can be: a position along a control axis, a rate of change along a control axis, acceleration along a control axis, a direction along a control axis (e.g., positive direction, negative direction, etc.), and/or any other suitable parameter.

The system preferably includes a set of control axes (e.g., inceptor set). The set of control axes (e.g., inceptor set) can include: 2 axes, 3 axes, 4 axes, more than 4 axes, and/or any appropriate number of control axes. The control axes can be distributed across different: inceptors, hands (of user), users (e.g., distributed between left and right hands of user), and/or otherwise suitably distributed. In one example, all control axes (e.g., the inceptor set) can be located on the same inceptor.

A control axis can be: linear, arcuate (e.g., spherical axes), a combination of the above, and/or otherwise defined. Examples of different control axes include: lateral, longitudinal, vertical, pitch, yaw, roll, polar, azimuthal, and/or any other suitable control axis. The control axis can be defined relative to an input mechanism, the vehicle (e.g., aircraft), or otherwise defined. Arcuate control axes are preferably defined relative to a point or an axis of rotation, wherein the axis of rotation can be shared or different when the inceptor set includes multiple arcuate control axes.

A control axis is preferably an actuation axis of an inceptor (e.g., physical departure axis of the inceptor), but can alternatively be a virtual control axis (e.g., a digital slider's sliding axis), or be any other suitable axis.

Different actuation axes (e.g., different degrees of freedom) of an inceptor preferably map to different control axes (e.g., different physical departures of an inceptor are preferably treated different control axes), but can alternatively map to the same control axis. For example, the inceptor's x-axis, y-axis, and z-axis inceptor can map to the first, second, and third control axes, respectively, while thumbwheel and trigger actuation can map to a fourth and fifth control axis, respectively. In a second example, the inceptor's x-axis and y-axis can map to the first control axis. In a third example, the inceptor's x-axis maps to both the first and second control axes (e.g., concurrently; in different flight regimes; etc.). However, different control axes can be otherwise associated with different input mechanism degrees of freedom. The control axis-actuation axis mapping is preferably static, but can alternatively be dynamically determined (e.g., based on the flight regime, the vehicle state, etc.).

The desired aircraft response functions as intermediate parameter to translate the input into effector-level control outputs. The desired aircraft response is preferably generated by a command model (output) and used as an input for the control engine, but can be otherwise generated and/or ingested. The desired aircraft response can specify aircraft motion in one or more degrees of freedom of the aircraft. The desired aircraft response can be in a rotational or linear degree of freedom of the aircraft. The aircraft responses can be: vertical, longitudinal, lateral, pitch, yaw, roll, any combination thereof, and/or in any appropriate direction or about any rotational axis.

The desired aircraft response can be an aircraft response in: position (or flightpath) control, rate (or velocity) control, acceleration control, and/or a combination thereof. Position (or flightpath) control can refer to: pitch angle, roll angle, heading (yaw angle), altitude (or AGL), latitude, longitude, GPS coordinate position, future waypoint position, and or any other appropriate angular or linear position control. Rate (or velocity) control can refer to: heading rate (yaw rate), vertical rate, lateral translation rate, airspeed (or speed) rate, longitudinal translation rate, roll rate, pitch rate, sideslip rate, load factor rate, and/or any other appropriate rate. Acceleration control can refer to a rate of change of any rate control parameter(s).

The desired aircraft response can be binary (e.g., accelerate at a set rate or not accelerate at all), continuous (e.g., wherein the desired aircraft response can have one of a set of values along a predetermined continuum), discrete (e.g., one of a predetermined set of values), or otherwise characterized.

The desired aircraft responses in any degree of freedom can be blended with any appropriate proportion or relationship. Blending proportionality can be: pre-determined, dynamically determined based on the vehicle state, the flight regime (e.g., transition regime), trimmed, determined based on performance protections (e.g., flight envelope protections), and/or otherwise determined. Desired aircraft responses are preferably the same in different regimes of flight, but can alternately be different in different regimes of flight.

The desired aircraft response is preferably determined based on the command input and the current flight regime, but can additionally or alternatively be determined based on the current or predicted vehicle state, a combination of the above, and/or any other suitable input.

Different command inputs (e.g., associated with different control axes) are preferably mapped to different desired aircraft responses (or classes thereof), but the same control axis can be mapped to different desired aircraft responses (e.g., wherein different input parameters map to different aircraft responses; wherein the same input parameter maps to different aircraft responses across different flight regimes, etc.), or the same desired aircraft response can be commanded by different control axes. However, the desired aircraft responses can be otherwise commanded by different command inputs.

Control axes are preferably mapped to desired aircraft responses with similar axis parameters (e.g., linear control axes map to linear desired aircraft responses, rotational control axes map to rotational desired aircraft responses, control axes are mapped to desired aircraft responses with similar relationships to the ego-vehicle, etc.), but can additionally or alternatively be mapped to desired aircraft responses with disparate axis parameters. For example, a command input received along a lateral control axis can be associated with lateral aircraft response.

The same command input preferably maps to the same desired aircraft response across different flight regimes, but can alternatively map to different desired aircraft responses across different flight regimes.

The desired aircraft response can be: selected (e.g., from a lookup table, a database, etc.), calculated, or otherwise determined. In a first example, determining the aircraft response includes determining an aircraft response class (e.g., position control, rate control, acceleration control, etc.) based on the flight regime and the command input (e.g., the control axis of the command input, the input parameter of the command input, etc.). In a second example, determining the aircraft response includes calculating or selecting a desired aircraft response value, for a desired aircraft response associated with the flight regime and the control axis of the command input, based on the input parameter value of the command input. In an illustrative example of the second example, the desired vertical or ascend rate (desired aircraft response) can be determined based on the amount of inceptor displacement (input parameter) along the x-axis (control axis) of an inceptor. The equation used to calculate the desired aircraft response value can be generic, specific to the desired aircraft response, specific to the flight regime—control axis combination, and/or otherwise determined. In a third example, determining the aircraft response includes selecting the desired aircraft response value (e.g., from a lookup table) based on the flight regime and the input parameter value and the control axis of the command input. However, the desired aircraft response can be otherwise determined.

The command input (e.g., input parameter value) and/or desired aircraft response can optionally be capped, scaled, or otherwise adjusted based on: the current or predicted vehicle state, a set of rules, a set of static or dynamically determined limits or protections, and/or any other suitable information. The command input and/or desired aircraft response can be scaled in any appropriate manner, such as by a linear, non-linear, logarithmic, exponential, and/or other appropriate function. Input commands can be scaled differently on different sides of a threshold (such as an acceleration well threshold, a neutral position, etc.). Input command scaling can be pre-determined, dynamically determined, configurable by a user/pilot, and/or otherwise determined.

Variations of the unified command model include a single-inceptor, 4-axis command model. In examples of this variation, the unified command model can include "frontside" command characteristics analogous to command mappings associated with an airplane in forward flight. However, in alternative examples, the command model can have "backside" command characteristics analogous to command mappings associated with a helicopter in hover flight.

In relation to aircraft operation in forward flight (e.g., the airplane regime) using a single-inceptor command model, longitudinal inceptor motion (e.g., along the X-axis) commands the flightpath by way of pitch rate (e.g., load factor control), while maintaining the flightpath attitude. In some cases, the commanded pitch rate can be automatically scaled with airspeed (e.g., by the flight processor) such that full stick deflection maps to a reasonable normal load factor (e.g., to maintain full stick deflection fidelity. In such cases, in the airspeed range where stall would happen prior to achieving the demanded load factor, the control mapping can automatically change to an equivalent alpha (e.g., load factor) control above an "alpha protect" value, up to an "alpha max" value. Also in relation to forward flight, lateral inceptor motions (e.g., along the Y-axis) can command roll rate, and turns commanded thusly can be auto-coordinated and auto-compensated (e.g., wherein the flight processor applies the correct load factor increase to result in a level turn).

Also in relation to forward flight in a single-inceptor command model, twist (e.g., along the Z-axis) input to the single-inceptor commands sideslip. Z-twist inceptor input can command aircraft sideslip by pointing the nose of the aircraft in the direction of the inceptor twist. Such sideslip commands can change the heading of the aircraft without changing the flightpath direction, because the flight processor automatically compensates for the sideslip by actuating a combination of effectors to induce the countervailing bank needed to prevent a bank turn. In a specific variant, the Z-twist inceptor input can command sideslip below a threshold airspeed. Above the threshold airspeed, Z-twist inceptor input can be ignored or otherwise suitably used to generate control output.

In relation to hover flight in the single-inceptor command model, longitudinal inceptor motion (e.g., along the X-axis) can command the vertical motion rate. In cases wherein height (e.g., altitude) data is available, the vertical rate command can schedule a height-change rate of the aircraft. Twist (e.g., along the Z-axis) motion of the inceptor commands heading rate; the commanded heading can hold once the inceptor is returned to the neutral position but can alternatively drift at the commanded heading rate once the inceptor is returned to the neutral position.

Also in relation to hover flight in the single-inceptor command model, longitudinal (e.g., X-axis) groundspeed can be commanded via the A-axis inceptor motion (e.g., a single axis actuator on the inceptor, such as a wheel as shown in FIG. 6). The A-axis actuation can be dynamically mapped between aircraft velocity and acceleration (e.g., wherein the A-axis commands velocity control when the aircraft is moving at near-zero velocity, and commands acceleration control when further away from the zero-velocity point). Lateral (e.g., Y-axis) groundspeed can be controlled with lateral (e.g., Y-axis) inceptor deflection in hover flight using the single-inceptor command model.

In relation to transitional flight regimes in the single-inceptor command model, the motion of the inceptor along the 4 independent axes blends between controlling different aspects of the aircraft attitude and motion. In a specific example, longitudinal inceptor motion (e.g., along the X-axis) blends between commanding vertical rate (e.g., in hover) and commanding flightpath rate (e.g., in forward flight). Likewise, twist (e.g., Z-twist) motion of the inceptor blends between commanding heading rate (e.g., in hover) and sideslip control (e.g., in forward flight). Similarly, lateral (e.g., Y-axis) motion of the inceptor blends between commanding lateral translation (e.g., in hover) and coordinated turns (e.g., in forward flight); the A-axis inceptor motion blends between commanding groundspeed (e.g., in hover) and airspeed acceleration control (e.g., in forward flight); and the pitch attitude of the aircraft can be gradually de-coupled from the flightpath control as the aircraft slows from forward flight into hover. The blending of each of the aforementioned command axes is preferably scheduled against the airspeed of the aircraft (e.g., wherein commands are mapped entirely to hover behavior at an airspeed substantially equal to zero and mapped entirely to airplane behavior at an airspeed greater than the minimum stall speed, and mapped to transitional control outputs by the flight processor in proportion to the airspeed between zero and the minimum stall speed), but can be otherwise suitably scheduled.

In variations, the single-inceptor command model can otherwise suitably map the axes of the inceptor to aircraft actions in various flight regimes and/or ground operations (e.g., as shown by example in FIG. 7).

Alternative variations of the unified command model can include a two-inceptor mapping of longitudinal, lateral, and vertical control. In such variations, each inceptor axis defines a longitudinal (e.g., X-axis) and lateral (e.g., Y-axis) mapping and the model includes a blend region (e.g., transition regime) between forward flight (e.g., airplane) and hover regimes. With respect to the longitudinal mapping, the first inceptor (e.g., "pitch inceptor") can control the aircraft pitch (e.g., vertical component of the flightpath) when the aircraft is in forward flight, and the vertical motion rate when the aircraft is in hover. The second inceptor (e.g., "throttle inceptor") controls the airspeed/speed (e.g., via thrust modulation) when the aircraft is in forward flight, and translational motion (e.g., speed, airspeed, groundspeed, etc.) in the longitudinal direction when the aircraft is in hover. With respect to the lateral control mapping, the first inceptor (e.g., "roll inceptor") can command coordinated turns (e.g., banking turns) when the aircraft is in forward flight, and yaw (e.g., heading) control when the aircraft is in hover. The second inceptor (e.g., "yaw inceptor") can map commands to sideslip (e.g., de-coordinated heading adjustment) when the aircraft is in forward flight, and to lateral (e.g., left/right) translational control in hover. However, variations including a two-inceptor mapping can be otherwise suitably implemented.

In a first specific variant, the command model includes four input axes. Preferably, all four input axes are located on a single inceptor, but they can alternately be distributed between multiple inceptors and/or otherwise included as part of the input mechanism. The first input axis maps to: a desired pitch response in the forward regime, a desired vertical translation response in the hover regime, and a blended pitch and vertical translation response in the transition regime. Preferably, the first input axis is the X-axis of the inceptor, but can be any other suitable inceptor actuation axis. The second input axis maps to: a desired roll response in the forward regime, a desired lateral translation response in the hover regime, and a blended roll and lateral translation response in the transition regime. The desired roll response is preferably roll rate, but can additionally or alternately include a flightpath response and/or other response. Preferably, the second input axis is the Y-axis of the inceptor, but can be any other suitable inceptor actuation axis. The third input axis maps to: a desired sideslip response in the forward regime, a desired vertical yaw response in the hover regime, and a blended sideslip and yaw response in the transition regime. The third input axis also optionally maps to steering during ground operations (taxiing). Preferably, the yaw response is a heading rate (yaw rate) response. The sideslip response can optionally be phased out above a sideslip threshold airspeed, which can avoid averse aerodynamic loading and inefficiency. The sideslip thresholds airspeed can be: <50 kts, 20 kts, 30 kts, 40 kts, 50 kts, 60 kts, 70 kts, 80 kts, 90 kts, 100 kts, 110 kts, 125 kts, 150 kts, between 50 and 150 kts, >150 kts, and/or any other appropriate airspeed. Preferably, the third input axis is the Z-axis of the inceptor, but can be any other suitable inceptor actuation axis. The fourth input axis maps to: a desired airspeed response in the forward regime, a desired longitudinal translation response in the hover regime, and a blended airspeed and longitudinal translation response in the transition regime. The fourth input axis also optionally maps to forward thrust/wheel power during ground operations (taxiing). The longitudinal translation can include rate and/or acceleration response, but can include any appropriate type of response, and can optionally include an acceleration well (e.g., rate control below a threshold, acceleration control above a threshold). The airspeed (or speed) response is preferably a rate response, but can be any appropriate type of response. Preferably, the fourth input axis is the A-axis of the inceptor, but can be any other suitable inceptor actuation axis.

In an alternate version of the first specific variant, the second input axis and the third input axis have different map to different desired responses. The second input axis maps to: a blended roll rate, heading rate, and flightpath response in the forward regime; a desired heading rate (yaw rate) response in the hover regime, and a blended roll, heading, and flightpath response in the transition regime. The third input axis maps to: a desired sideslip response in the forward regime, a desired lateral translation response in the hover regime (which can be employed with an acceleration well), and a blended sideslip and lateral translation response in the transition regime. The third input axis also optionally maps to steering during ground operations (taxiing). The sideslip response can optionally be phased out above a sideslip threshold airspeed (or speed), which can avoid averse aerodynamic loading and inefficiency. The sideslip thresholds airspeed can be: <50 kts, 20 kts, 30 kts, 40 kts, 50 kts, 60 kts, 70 kts, 80 kts, 90 kts, 100 kts, 110 kts, 125 kts, 150 kts, between 50 and 150 kts, >150 kts, and/or any other appropriate airspeed.

The unified command model implemented by the flight processor can, in variations, control different parameters for different input ranges. In a first variant, physical departures of the inceptor position from a neutral position in a positive direction and physical departures of the inceptor position from a neutral position in a negative direction can be associated with the same desired aircraft response or a different desired aircraft response. In an example, the input associated with the vertical translation maps to an acceleration in the vertically upward direction (for physical departures of the inceptor position from a neutral position in a positive direction) and a velocity in the vertically downward direction (for physical departures of the inceptor position from a neutral position in a negative direction). In a second variant, the command model includes an acceleration well; physical departures of the inceptor position smaller than the threshold map to a velocity control and physical departures of the inceptor position greater than the threshold map to a velocity control. The threshold can be a percentage of the maximum departure from the neutral position, such as: 10%, 20%, 30%, 40%, 50%, 60%, 70%, 80%, 90%, or any other appropriate percentage. There is preferably an acceleration well in a vertical direction and/or longitudinal direction, but there can additionally or alternately be an acceleration well in the lateral direction, about any rotational axis of the aircraft, and/or tied to any other aircraft response. The acceleration well can be present in the hover regime, transition regime, and/or forward regime.

Figure 11:
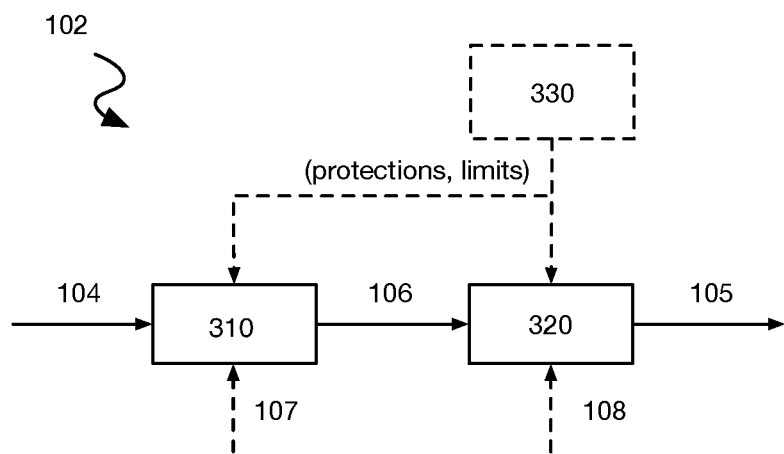
FIG. 11 is a schematic diagram of an example of software modules executing on the flight processor.

The flight processor, in variations, can include a protection engine 330 which functions to automatically limit the control outputs to enforce performance protection (such as envelope protection) on the aircraft as shown in the example in FIG. 11. Performance protection functions to prevent the user from exceeding the operational limits of the aircraft, which defines a set of constraints on the actions the aircraft can take while in flight. Performance protection can also function to eliminate sources of general aviation accidents including loss of aircraft control and controlled flight into terrain. Performance protection can also function to maximize demandable performance of the aircraft (e.g., the user can provide inputs without exceeding structural limits, which are automatically enforced by the command model).

Performance protections can include: envelope limits (e.g., to maintain aircraft structural integrity), controller limits (e.g., to prevent loss of control), protective functions (e.g., to prevent loss of control), command model limits (e.g., to maintain a handling qualities, to control the user experience, etc.), and/or any other suitable protections. The limits can be: a threshold, bounds of a range (e.g., a performance protection regime), or otherwise defined. Each set of performance protections can include one or more limits for one or more: command inputs (e.g., control axes, input parameters), desired aircraft responses, control outputs, and/or any other suitable parameter. The limits can be: hard limits (e.g., never exceeded), soft limits (e.g., can be selectively exceeded, such as based on persistent command input, vehicle state, flight regime, etc.), and/or otherwise characterized. The limits can be: static, dynamically determined (e.g., based on the flight plan, the vehicle state, the flight regime, the effector states, etc.), or otherwise determined.

Figure 12A:
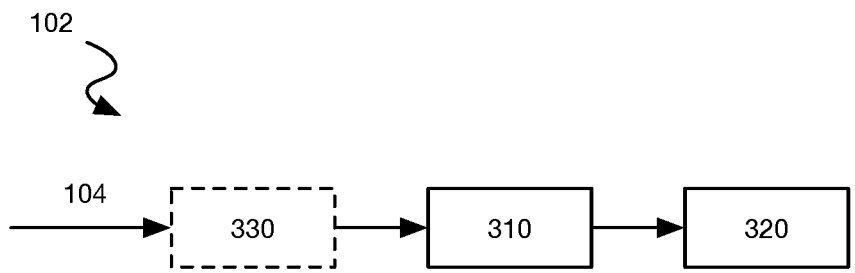
FIGS. 12A-D are first, second, third, and fourth variants of the example in FIG. 11.
Figure 12B:
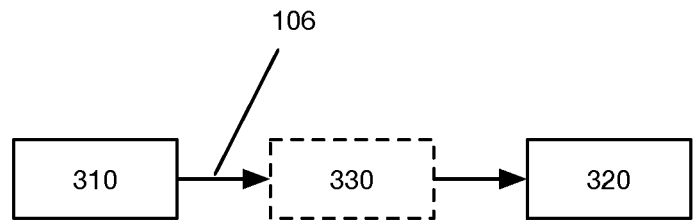
Figure 12C:
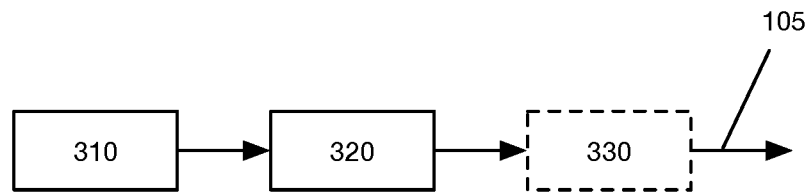
Figure 12D:
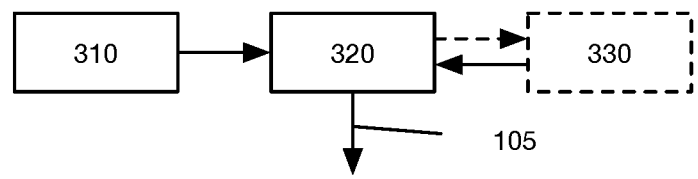

In a first example, the protection engine enforces performance protections on the user input (e.g., command input) before the user input is interpreted by the command model (example shown in FIG. 12A). In a second example, the protection engine enforces performance protections on the desired aircraft response before it is interpreted by the control engine (example shown in FIG. 12B). In a third example, the protection engine enforces performance protections on the control output (example shown in FIG. 12C). In a fourth example, the control engine generates a control output based on an input from the protection engine (example shown in FIG. 12D). However, the protection engine can enforce performance protections in any other suitable manner.

In variations, the protection engine can protect aircraft from adverse aerodynamic effects (e.g., stall, vortex ring state/VRS, etc.) by determining the vehicle state and preventing user inputs causing the aircraft to transition into an vehicle state with adverse aerodynamic effects. For example, the protection engine can automatically limit the pitch control such that the aircraft cannot enter a stall condition, and adjust the limit based on airspeed such that a stall condition is automatically avoided. In another example, the bank angle can be automatically limited to prevent the aircraft from rolling beyond a threshold angle, effectively ignoring user input corresponding to bank angles greater than the threshold. However, the flight processor can otherwise suitably implement envelope protection.

Figure 9:
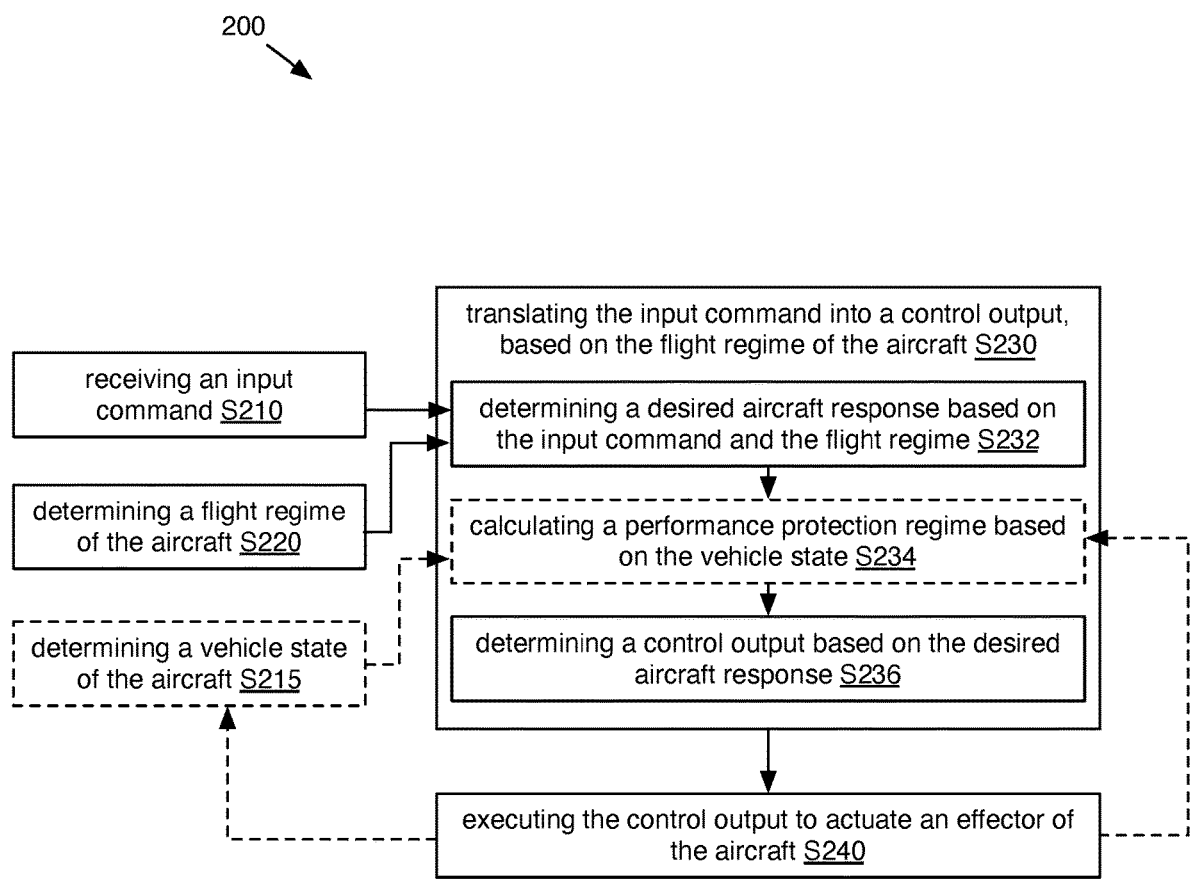
FIG. 9 is a flowchart diagram of a unified command method variant.

In a specific example, the flight processor executes S230 and includes: a command model executing S232, a control engine executing S234, and a protection engine executing S236 (example shown in FIG. 9).

In relation to implementation of the unified command model, the bank angle can be multi-modally mapped to the lateral inceptor motion, wherein the bank angle is controlled differently depending upon its current state. For example, if the bank angle is near 5 degrees from level and the inceptor centered to the default position the aircraft can automatically stabilize to level flight, whereas if the bank angle is between 5 and 35 degrees the bank angle can be automatically maintained when the inceptor is centered to the default position. In another example, the user can command a bank angle beyond 35 degrees with continued lateral stick input, up to 65 degrees, but the aircraft will return to a fixed 35-degree bank when the inceptor is returned to the default position. However, the bank angle commands can have any other suitable mapping (e.g., multi-modal with different threshold angles, uni-modal, etc.).

Figure 13A:
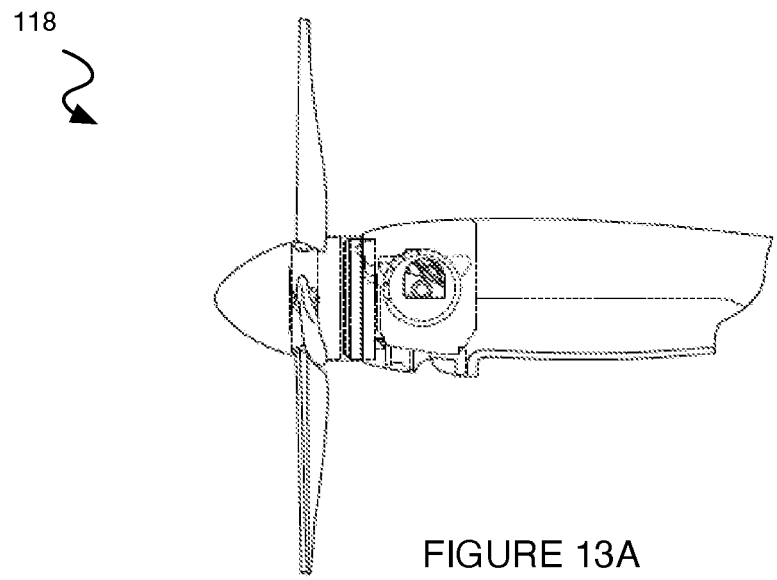
FIGS. 13A-C is a side view of an example of a tilt rotor mechanism in the forward, transition, and hover regimes, respectively.
Figure 13B:
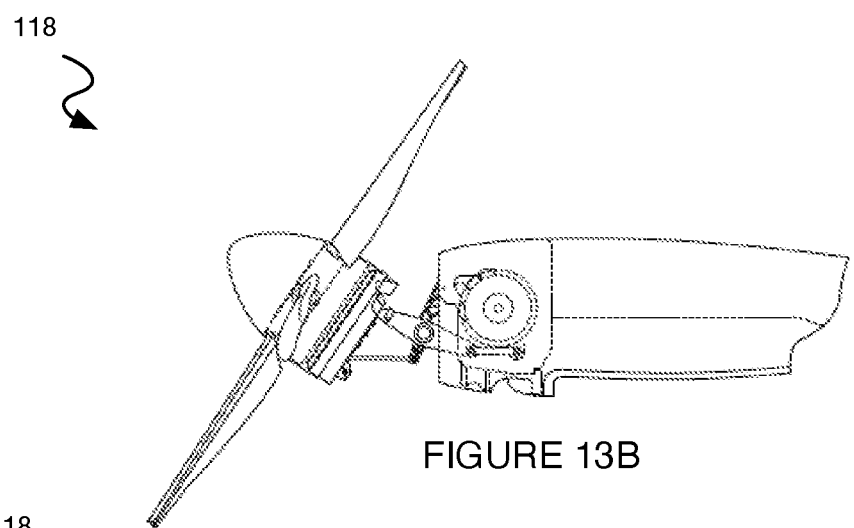
Figure 13C:
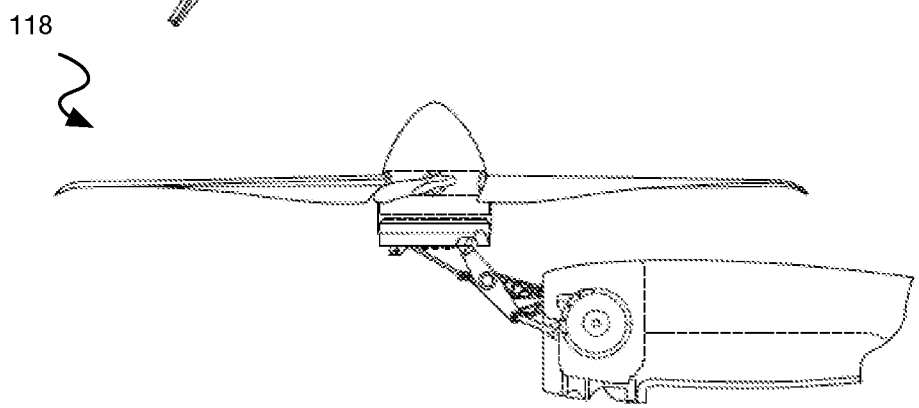

The effectors function to generate and/or adjust aerodynamic forces and/or moments on the aircraft, in response to control outputs received from the flight processor (e.g., generated according to a unified command model based on input received from a user). The effectors can include ailerons in, ruddervators 113, flaps 112, propulsion units 118 (e.g., tiltable propellers with variable blade pitch, an example is shown in FIGS. 13A-C), and any other suitable control surfaces and/or actuatable mechanisms that can affect the flight of the aircraft. The effectors can also include actuators that actuate the control surface(s) of the effectors such as one or more: blade pitch mechanism 114, tilt mechanism 115, motor 116 (by varying RPM), and/or other suitable actuator(s).

Figure 8:
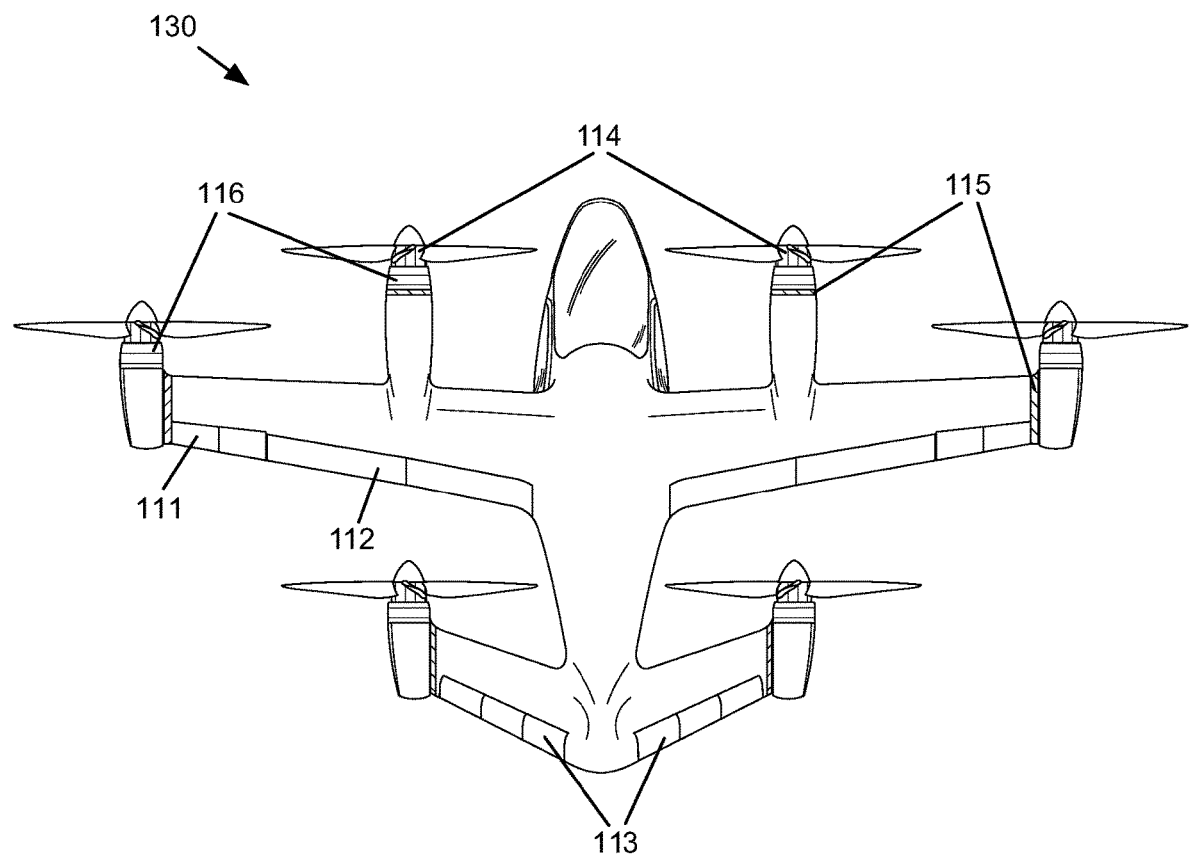
FIG. 8 depicts an example aircraft and effectors thereof, used in relation to the unified command system and method.

In a specific example, as shown in FIG. 8, the effectors of the system include ailerons (e.g., 2 on each side of the aircraft), ruddervators (e.g., 3 on each side of the aircraft), flaps (e.g., 2 on each side of the aircraft), and propulsion unit associated effectors (e.g., 6 nacelle tilt actuators, motors with adjustable RPM, and propeller blades with variable pitch). Each effector is preferably associated with and coupled to a single actuator (e.g., a rotary actuator mounted on the hinge line of actuated control surfaces, a variable pitch linkage actuator, etc.) that positions the effector (or increases the rotary power delivered to other effectors, as in the case of the motor) in response to control output received from the flight processor. However, each effector can additionally or alternatively be associated with any suitable number of actuators.

Different combinations and/or sub combinations of effectors can be alternately controlled by the flight processor to control aircraft motion about various axes, depending upon the flight regime in which the aircraft is operating. For example, in forward flight, the ailerons can be used to roll the aircraft, the ruddervators can be used to pitch and yaw the aircraft, the flaps can be used for lift and/or drag curve adjustment, the motor RPM can be modulated to control the overall thrust (e.g., wherein the motors are modulated collectively) and yaw (e.g., wherein the motors are modulated differentially across the longitudinal midline of the aircraft), the blade pitch of the propeller can be used to adjust thrust (e.g., wherein the blade pitches of all propulsion units are modulated collectively) and yaw (wherein the blade pitches of propulsion units are modulated differentially across the longitudinal midline of the aircraft). In contrast, in hover flight, for example, the ailerons, ruddervators, and flaps are not effective, and the motor RPM and propeller blade pitches can be varied collectively and/or differentially (e.g., as appropriate) to control lift, pitch, and roll, and the propulsion unit tilt linkages can be actuated to control translation and/or yaw of the aircraft. However, different combinations and/or sub combinations of effectors can be otherwise suitably used to affect aircraft control in various flight regimes. In a specific variant, the aircraft can enable constant pitch attitude in the transition (and/or hover) regimes by controlling the blade pitch and/or motor RPM.

The system can include one or more sensors to measure aircraft parameters which can be used to determine vehicles state and/or flight regime. Sensors can be any appropriate type of sensor and can measure absolute or relative: position, speed, velocity, acceleration, angular speed, angular velocity, angular acceleration, pressure, temperature, force, torque, weight, weight distribution, and/or any other appropriate parameters. Measurements can be relative to the aircraft (or a component on the aircraft), the air, the ground, and/or any other appropriate reference. Sensors can be one or more: time-of-flight sensors, radar sensors, lidar sensors, spatial sensors (e.g., inertial measurement sensors, accelerometer, gyroscope, altimeter, magnetometer, AGL sensor, etc.), location sensors (e.g., GPS, GNSS, triangulation, trilateration, etc.), force sensors (e.g., strain gauge meter, load cell), air flow meters, proximity sensors, and/or any other suitable sensors.

The system of the preferred embodiment and variations thereof can be embodied and/or implemented at least in part as a machine configured to receive a computer-readable medium storing computer-readable instructions. The instructions are preferably executed by computer-executable components preferably integrated with and/or part of the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

4. Method

As shown in FIG. 2, the unified command method 200 includes: receiving an input command S210; determining a flight regime of the aircraft S220; translating the input command into a control output, based on the flight regime of the aircraft S230; and, executing the control output S240. S230 can further include the sub-steps of: determining a desired aircraft response based on the input command and the flight regime S232 and determining a control output based on the vehicle state and the desired aircraft response S236. S230 can optionally include the sub-step of: calculating a performance protection regime based on the vehicle state S234. The method 200 can optionally include determining flight regime of the aircraft S215.

The unified command method 200 is preferably implemented using a system analogous to the unified command system 100 described above, and in conjunction with a tilt thrust aircraft that includes a plurality of propulsion units (e.g., a tilt-prop aircraft including six electrically-powered propulsion units). However, the unified command method 200 can additionally or alternatively be implemented using any other suitable aircraft control system, in conjunction with any other suitable aircraft.

Block S210 includes receiving an input command. Block S210 functions to determine the intention of the user, and convert the user's intention into an input that can be processed (e.g., by a flight processor) into control outputs (e.g., for actuating aircraft effectors). Block S210 is preferably performed using an input mechanism (e.g., an inceptor, a pair of inceptors, etc.) substantially as described above in relation to the system 100 but can additionally or alternatively be performed using any suitable means of obtaining input (e.g., audio commands, user head and/or eye tracking, etc.).

The input command preferably corresponds to a desired aircraft response, which can be a trajectory, flightpath, translation, rotation associated with one or more degrees of freedom of the aircraft. The input command can additionally or alternately correspond to a desired change in vehicle state, a desired effector actuation (such as deploying landing gear), and/or include any other appropriate input commands. In a first variant, the user input corresponds to a desired flight-path. In a second variant, the user input corresponds to a desired motion (translation and/or rotation with a particular displacement, velocity, and/or acceleration) of the aircraft. In a third variant, the user input corresponds to a desired deck attitude (pitch angle and/or roll angle, lateral angle relative to the ground and longitudinal angle relative to the ground). In a fourth variant, the user input is a geo-brake user input. Alternately, the input command can be received automatically based on the performance protections (e.g., flight envelope) and/or one or more sensors on the aircraft, or otherwise received.

Optional block S215 includes determining a vehicle state of the aircraft, which can be used for determining the flight regime of the aircraft and/or for determining the control output. The vehicle state functions to characterize the current operational state of the aircraft and is preferably determined based on sensor outputs. The vehicle state can be determined by sensor fusion, sensor fault detection/rejection, or otherwise determined. The vehicle state is preferably a state vector, but can additionally or alternatively be a scalar value, a classification, or any other suitable characterization of the vehicle state. The vehicle state can include: atmospheric pressure, static air pressure, dynamic air pressure, angle of attack, angle of sideslip, static air temperature, force measurements, torque measurements, angle measurements, linear position (e.g., GPS position), linear velocity, linear acceleration, angular position, angular velocity, angular acceleration, and/or any other appropriate vehicle state parameters at any appropriate position/axis of the aircraft.

Block S220 includes determining a flight regime of the aircraft. Block S220 functions to determine whether the aircraft is in forward flight (e.g., airplane regime), hover, and/or a transitional regime (e.g., for provision to a flight processor and/or to facilitate translation of the input command into a control output in accordance with Block S230). Block S220 can include determining the flight regime based on the airspeed, groundspeed, tilt-linkage position (e.g., of each of the propulsion units), and/or any suitable combination of the aforementioned bases. Block S220 can additionally or alternatively include determining the flight regime of the aircraft in any other suitable manner. Block S220 can be performed automatically using one or more sensors (e.g., airspeed sensors, groundspeed and/or geographic position sensors, actuator state sensors and/or encoders, etc.) that directly measure the flight regime, and/or otherwise suitably performed using any suitable input.

Block S220 can occur independently of S215, be dependent on S215, S215 can be partially/fully dependent on S220, S215 and S220 can be co-dependent on one or more sensor measurements, and/or otherwise suitably implemented. Block S220 can be performed at the flight processor and/or vehicle navigation system, and/or at another endpoint. In a first example, the flight processor receives the vehicle state from the vehicle navigation system and determines the flight regime based on the vehicle state. In a second example, the flight processor receives the flight regime from the vehicle navigation system. In a third example, the flight processor determines the flight regime.

Block S230 includes translating the input command into a control output, based on the flight regime of the aircraft (e.g., determined in Block S220) and a command model. Block S230 functions to implement fly-by-wire aircraft control by the user, and to reduce cognitive workload on the user by automatically decoupling the controllable axes from the flight regime (e.g., using the flight processor and aircraft effectors) and allowing the user to provide input related to desired aircraft actions (e.g., instead of effector positions).

Block S230 preferably includes the sub-steps of: determining a desired aircraft response based on the input command S232, determining a control output based on the desired aircraft response S326, and optionally calculating a performance protection regime based on the vehicle state S234.

Determining a desired aircraft response based on the input command S232 can optionally be based on the flight regime, and functions to map the input to an aircraft response. S232 takes in input mechanism positions (e.g., angular, linear, percent displacement, etc.) and optionally the flight regime as an input. In accordance with the command model, the input is mapped to a desired aircraft response output (e.g., desired change in a set of vehicle state parameters such as: airspeed, pitch rate, etc.).

The command model is preferably a unified command model (e.g., a frontside unified longitudinal control command model including full envelope protection), but can additionally or alternatively include any other suitable command model. In a specific example, Block S230 includes translating received inputs (e.g., received in accordance with Block S210) according to a unified command model as follows, depending on the flight regime: X-axis inceptor motion is translated into vertical rate control (e.g., in the hover regime) and into load factor and flightpath maintenance control (e.g., in the forward flight regime); A-axis inceptor motion is translated into X-translational rate control (e.g., in the hover regime) and X-acceleration and airspeed (or speed) maintenance control (e.g., in the forward flight regime); Y-axis inceptor motion is translated into Y-translational rate control (e.g., in the hover regime) and roll rate and bank angle maintenance (e.g., in the forward flight regime); Z-axis inceptor motion is translated into heading rate and maintenance control (e.g., in the hover regime) and sideslip angle control (e.g., in the forward flight regime). Block S230 can include translating inputs to outputs according to a unified lateral command model that makes the input action that controls "turning" behavior of the aircraft the same between rotary-wing (e.g., hover) and fixed wing (e.g., airplane) regimes. However, Block S230 can additionally or alternatively include translating user inputs to control outputs according to any other suitable command model.

Determining a control output based on the desired aircraft response S236 can optionally be based on the vehicle state and/or actuator feedback, and functions to convert the desired aircraft response into a control output which can be executed to generate an aircraft response (e.g., change in vehicle state). S236 preferably takes in a desired aircraft response and optionally a vehicle state (e.g., received, measured, stored, or otherwise, determined) as inputs, but can accept any other suitable set of inputs. In a first variant, the control output can be determined by a lookup table for a given set of vehicle state parameters.

In a second variant, the control output is dynamically calculated based on the vehicle state using a pre-determined vehicle model (model predictive control), feedforward control, feedback control, open-loop control, and/or other technique. In this variant, the system can include: a single model for control output determination, multiple models (e.g., different models for different desired aircraft responses, different models for different effectors, etc.), and/or any other suitable number of models. In an example of the second variant, determining the control output includes: assuming first-order effector or actuator dynamics and controlling higher order dynamics based on feedback (e.g., closed-loop feedback). In a specific example, controlling higher order dynamics based on feedback includes: determining a control output for an effector or actuator based on the desired aircraft response and the current vehicle and/or effector or actuator state, controlling the effector or actuator based on the control output, and generating new control outputs based on the desired aircraft response and the updated vehicle and/or effector or actuator state.

Block S230 can optionally include the sub-step of calculating a performance protection regime based on the vehicle state S234, which can ensure the control output is within protection limits. Protection limits can apply to different aircraft parameters such as: vertical rate (rate of descent), angle of attack (stall limit), altitude (AGL limits), aerodynamic loads (thrust/lift limits), airspeed (overspeed limits), structural (load limitations), and/or other aircraft parameters. The performance protection regime can include a flight protection envelope, regulatory limitations, and/or other limitations. Protection limits of the performance protection regime can be determined: dynamically, by a lookup-table, by passing vehicle state (and/or other parameters) through a pre-trained neural network or other vehicle model, by a set of functions, and/or otherwise determined. Each flight regime can be associated with one or more protection parameter sets, determined based on one or more considerations such as: flight envelope (preserve structural integrity), controller limits (prevent loss of control), protective functions (prevent loss of control), command model limits (preserve handling qualities), and/or other considerations. Protection parameters can be used or satisfied: as a whole, based on protection consideration priority (e.g., wherein the protection considerations, in decreasing rank order, can include: flight envelope limits, controller limits, protective functions, and command model limits), or otherwise selected for use. S236 can apply absolute limiting functions which function as absolute not-to-exceed thresholds for one or more parameters alone or in combination, and protective or awareness functions which function as soft thresholds which may result in unusual attitudes or operate near performance/handling limits.

In a first specific example: the pitch has limits of −10 degrees, +30 degrees, +3.1 Nz, and −1.0 Nz, and employs protective functions at (requires increasing inceptor displacement to hold beyond)+20 degrees and −5 degrees. In a second specific example: the roll rate (or coordinated turn), has limits at +/−67 deg bank angle, and employs protective functions (requires increasing inceptor displacement to hold) beyond a 33 degree bank angle. In a third specific example, the sideslip angle (e.g., 20 deg) has a limit that decreases with increasing airspeed (or speed). In a fourth specific example, the airspeed rate has limits of +10 kts/sec and −20 kts/sec. In a fifth example, the vertical rate has limits of +1000 fpm and −500 fpm, with a protective function for the max rate of descent that decreases with AGL altitude. In a sixth specific example, the protections comply with FAR 23.337, FAR 23.335, FAR 23.2405, and/or FAR 23.441.

In response to exceeding an absolute and/or protective limit S230 can: recalculate control with modified input, adjust/shift control output within limits (e.g., within protection regime), notify a user (e.g., via display, haptic feedback), ignore an input command, scale an input command, determine an action (ignore, notify, adjust, and/or recalculate) based on the parameter and/or limit priority.

Block S230 (e.g., at sub-step 236 and/or at sub-step 234) can include prioritizing control output generation in response to user demand based on available aircraft resources (e.g., control authority, thrust availability, envelope limits, structural limits, terrain limits, etc.), according to demand prioritization. This can include preferentially controlling effectors based on a predetermined demand prioritization, even in cases wherein the user demands (e.g., provides input) actions that require deprioritized effector control. For example, in the hover regime, attitude control can be prioritized over velocities (e.g., thrust) or accelerations; in the transition regime, vertical thrust components can be prioritized over horizontal components; in the forward flight regime, structural limits can be prioritized over rate demands and/or airspeed demands by the user. However, Block S230 can additionally or alternatively include implementing any other suitable demand prioritization.

Block S230 can include automatically adjusting the control output according to a dynamic set point (e.g., wherein the user provides the set point, wherein the set point is automatically determined without the user's input, etc.). For example, velocity-related control outputs can be controlled based on an "acceleration well", wherein the ground speed automatically gradually reduces to zero when the aircraft is moving below a threshold airspeed (e.g., in the hover regime) without further control inputs (e.g., to prevent drift or active trim requirements).

Block S230 can optionally include sending a notification based on the command input and/or flight regime of the aircraft to notify a user of: a sensor reading, a set of vehicle state parameters, a flight regime, a protective limitation, approaching/exceeding a protective limit/threshold, an overspeed alert, a structural alert, an OEI alert, an AGL alert, a vertical descend rate alert, an aerodynamic loading alert, a fuel level (or battery charge level) alert and/or otherwise notify a user. Examples can include: sending to a display, sending to a haptic feedback device. The notification can be sent to the user and/or a third party via wired and/or wireless communication, and/or otherwise sent with any appropriate priority.

Block S240 includes executing the control output (e.g., generated in accordance with Block S230). Block S240 functions to directly control the effectors (e.g., effector positions, effector states, etc.) based on the translated user inputs (e.g., indirectly). Block S240 is preferably performed using one or more effectors (and associated actuators) analogous to those described above but can additionally or alternatively be performed using any other suitable actuatable mechanisms and/or control surfaces that can affect the forces and/or moments on the aircraft during flight.

In variations, Block S240 can result in changing the flight regime of the aircraft, and thus feed back into the translation of the user inputs (e.g., in Block S230) which is based at least in part on the flight regime of the aircraft. For example, the command method 200 can include a "geographic braking" feature, wherein the aircraft can be slowed to a stop relative to the ground position in a manner analogous to a land vehicle applied brakes. This includes automatically transitioning between forward flight and hover regimes as the aircraft slows below the stall speed, even as the user maintains the same command input (e.g., pulling back on an inceptor, pushing forward on an inceptor, pressing a brake pedal, etc.).

In further variations, Block S240 can include feeding back vehicle state variables into the command model executed in Block S230. For example, Block S240 can include reducing the controlled lift (e.g., in hover) by an amount equal to the ground force applied to the landing gear of the aircraft (e.g., measured using one or more load cells integrated with the landing gear), which can minimize the time that the aircraft is between land and aerial vehicle states.

In a first variant, the method comprises: receiving a geo-brake input from the user; and in response to receiving the geo-brake input, slowing the aircraft to zero-velocity relative to the ground.

In a second variant, the method comprises: determining a flight regime of the aircraft, the flight regime determined from a set of flight regimes comprising: a forward regime and a hover regime; receiving a set of input commands from a user at a first input mechanism, the set of input commands comprising: a first angular position on a first axis of the first input mechanism and a second angular position on a second axis of the first input mechanism; based on the flight regime of the aircraft, mapping the set of input commands into a set of desired aircraft responses, wherein: the first angular position maps to a desired pitch response in the forward regime and a desired vertical translation response in the hover regime; and the second angular position maps to a desired speed response in the forward regime and a desired longitudinal translation response in the hover regime; based on the set of desired aircraft responses, determining a control output; and executing the control output by actuating a set of effectors of the aircraft, wherein the set of effectors comprises a rotor. In an example of the second variant, mapping the set of input commands into the set of desired aircraft responses further comprises: trimming a desired aircraft response parameter, wherein the desired aircraft response parameter dependent on at least two dissimilar effectors of the aircraft.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A control system for an aircraft configurable between a forward configuration, a hover configuration, and ground operations, the control system comprising:
    an input mechanism movable along an x-axis, a y-axis, a z-axis, and an a-axis, wherein along the x-axis, the input mechanism maps the x-axis to:
        a pitch rate/flight path in the forward configuration;
        a vertical rate in the hover configuration; and
        braking motion during ground operations;
    wherein along the y-axis, the input mechanism maps the y-axis to:
        a roll rate/flight path in the forward configuration; and
        a lateral translational rate/acceleration rate in the hover configuration;
    wherein along the z-axis, the input mechanism maps the z-axis to:
        a sideslip response in the forward configuration;
        yaw in the hover configuration; and
        steering during ground operations; and
    wherein along the a-axis, the input mechanism maps the a-axis to:
        an airspeed rate in the forward configuration;
        a longitudinal translational rate and acceleration rate in the hover configuration; and
        a speed during ground operations; and
    a processor configured to provide a control output based on inputs received along each of the x-axis, the y-axis, the z-axis, and the a-axis, wherein the control output for each of the forward configuration, the hover configuration, and the ground operations is determined using a lookup table.

2. The system of claim 1, further comprising a geo-brake input mechanism to control a deceleration of the aircraft to zero-velocity relative to the ground in the hover configuration.

3. The system of claim 1, the input mechanism further configured to receive an input for a yaw response of the aircraft in the hover configuration and the processor configured to provide a further output based on the yaw response input.

4. The system of claim 1, wherein the input mechanism is a single hand-operated inceptor.

5. A method for controlling an aircraft between a forward configuration, a hover configuration, and ground operations, with a control system having an input mechanism and a processor, the method comprising:
    receiving an input along an x-axis at an input mechanism;
    mapping the input along the x-axis to:
        a pitch rate/flight path in the forward configuration;
        a vertical rate in the hover configuration; and
        braking motion during ground operations;
    receiving an input along a y-axis at the input mechanism;
    mapping the input along the y-axis to:
        a roll rate/flight path in the forward configuration; and
        a lateral translational rate/acceleration rate in the hover configuration;
    receiving an input along a z-axis at the input mechanism;
    mapping the input along the z-axis to:
        a sideslip response in the forward configuration;
        yaw in the hover configuration; and
        steering during ground operations; and
    receiving an input along an a-axis at the input mechanism;
    mapping the input along the a-axis to:
        an airspeed rate in the forward configuration;
        a longitudinal translational rate and acceleration rate in the hover configuration; and
        a speed during ground operations; and
    providing, with the processor, a control output based on each of the inputs received at the x-axis, the y-axis, the z-axis, and the a-axis, wherein the control output for each of the forward configuration, the hover configuration, and the ground operations is determined using a lookup table.

6. The method of claim 5, the method further comprises controlling a deceleration of the aircraft to zero-velocity relative to the ground in the hover configuration.

7. The method of claim 5, further comprising:
    receiving an input for a yaw response of the aircraft in the hover configuration; and
    providing an output based on the yaw response input.

8. The method of claim 5, wherein the input mechanism is a single hand-operated inceptor.

9. A non-transitory computer-readable storage medium storing instructions that, when executed by a control system for an aircraft having an input mechanism and a processor, cause the control system to control the aircraft between a forward configuration, a hover configuration, and ground operations, by performing operations comprising:

controlling, with the input mechanism, a pitch rate/flight path in the forward configuration, a vertical rate in the hover configuration, and braking motion during ground operations, along an x-axis of the input mechanism;

controlling, with the input mechanism, a roll rate/flight path in the forward configuration and a lateral translational rate/acceleration rate in the hover configuration along a y-axis of the input mechanism;

controlling, with the input mechanism, a sideslip response in the forward configuration, yaw in the hover configuration, and steering during ground operations along a z-axis of the input mechanism;

controlling, with the input mechanism, an airspeed rate in the forward configuration, a longitudinal translational rate and acceleration rate in the hover configuration, and a speed during ground operations along an a-axis of the input mechanism; and providing, with the processor, a control output based on inputs received along each of the x-axis, the y-axis, the z-axis, and the a-axis, wherein the control output for each of the forward configuration, the hover configuration, and the ground operations is determined using a lookup table.

10. The non-transitory computer-readable storage medium of claim 9, wherein the operations further comprise controlling a deceleration of the aircraft to zero-velocity relative to the ground in the hover configuration.

11. The non-transitory computer-readable storage medium of claim 9, wherein the operations further comprise:
receiving an input for a yaw response of the aircraft in the hover configuration; and
providing an output based on the yaw response input.

12. The non-transitory computer-readable storage medium of claim 9, wherein the input mechanism is a single hand-operated inceptor.

* * * * *